Jan. 7, 1941.     H. E. OLSON     2,227,736
INTERNAL COMBUSTION ENGINE
Filed May 4, 1939     7 Sheets-Sheet 1

INVENTOR
HERMAN E. OLSON
BY G. H. Braddock
ATTORNEY.

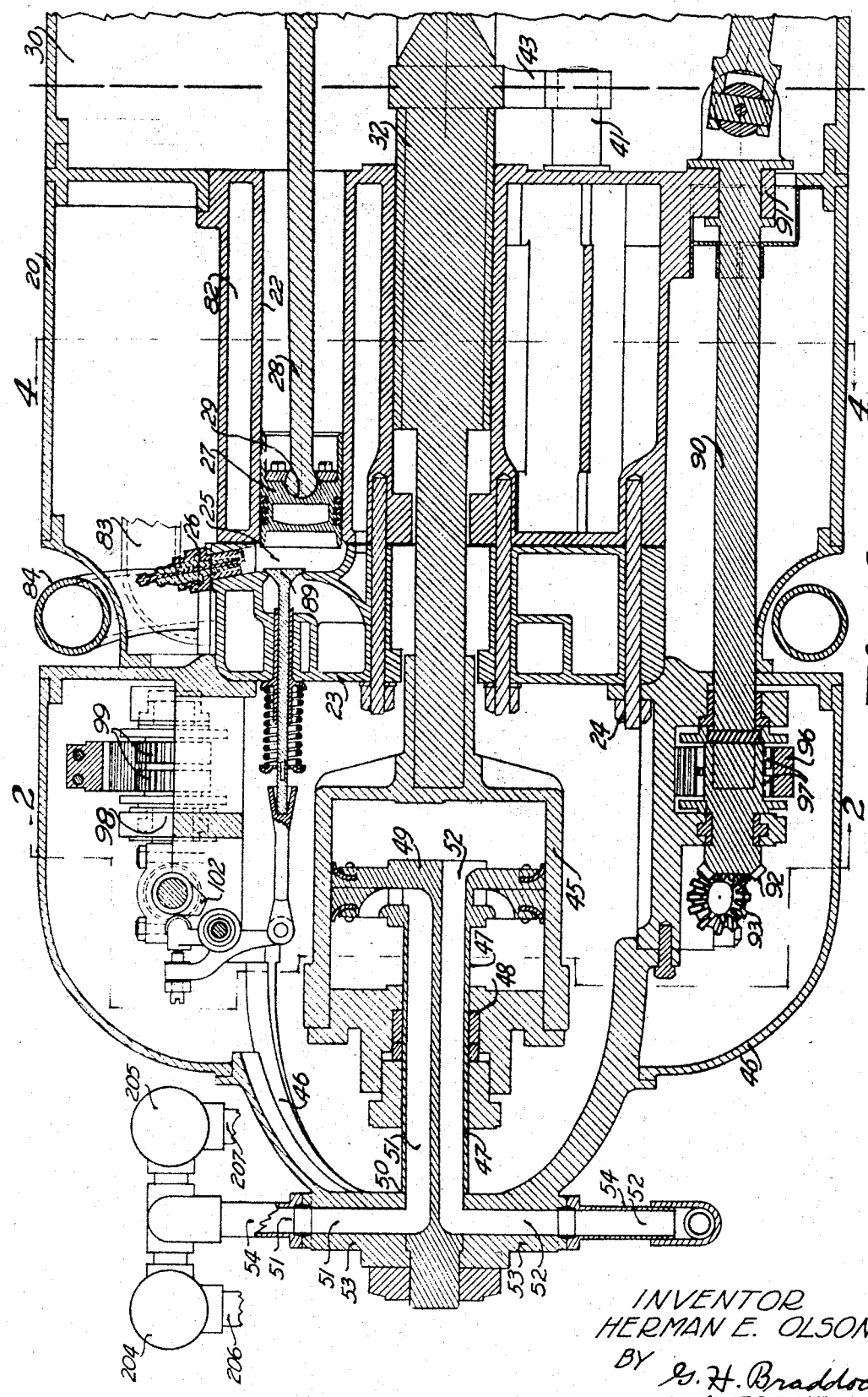

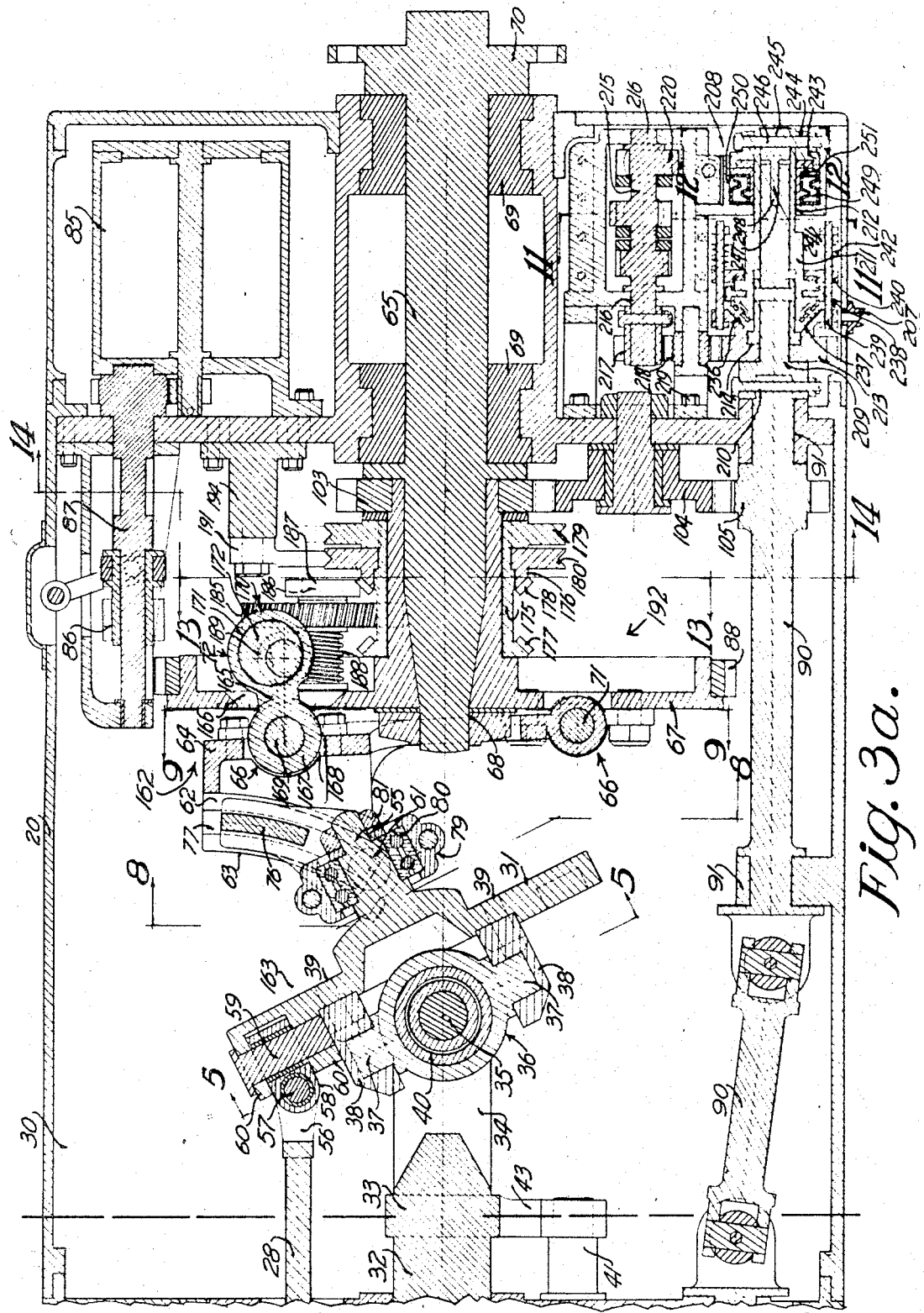

Jan. 7, 1941.   H. E. OLSON   2,227,736
INTERNAL COMBUSTION ENGINE
Filed May 4, 1939   7 Sheets-Sheet 4

INVENTOR
HERMAN E. OLSON
BY G. H. Braddock
ATTORNEY

Jan. 7, 1941.   H. E. OLSON   2,227,736
INTERNAL COMBUSTION ENGINE
Filed May 4, 1939   7 Sheets-Sheet 5

INVENTOR
HERMAN E. OLSON
BY G. H. Braddock
ATTORNEY

Jan. 7, 1941. H. E. OLSON 2,227,736
INTERNAL COMBUSTION ENGINE
Filed May 4, 1939 7 Sheets-Sheet 6
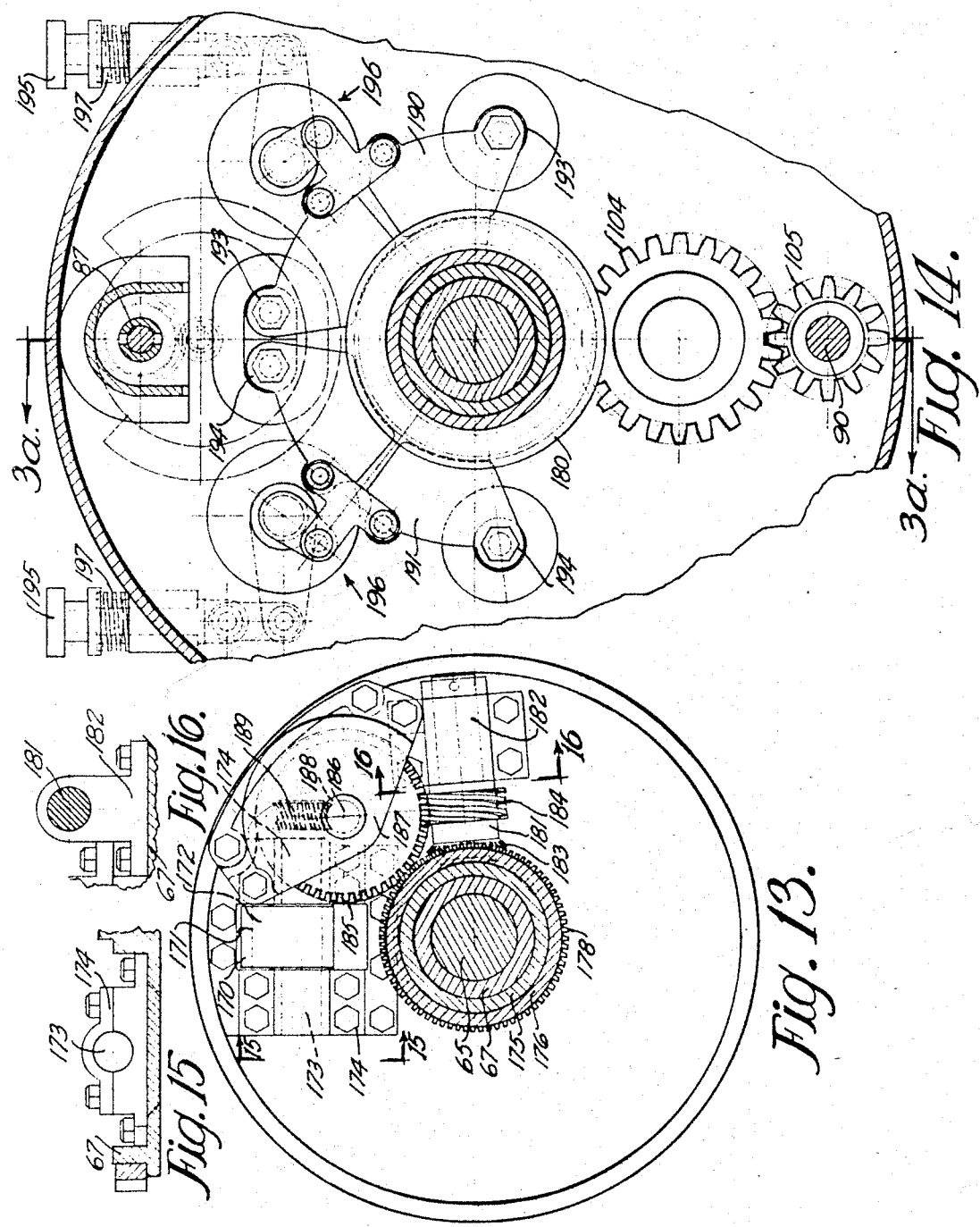
INVENTOR
HERMAN E. OLSON
BY G. H. Braddock
ATTORNEY

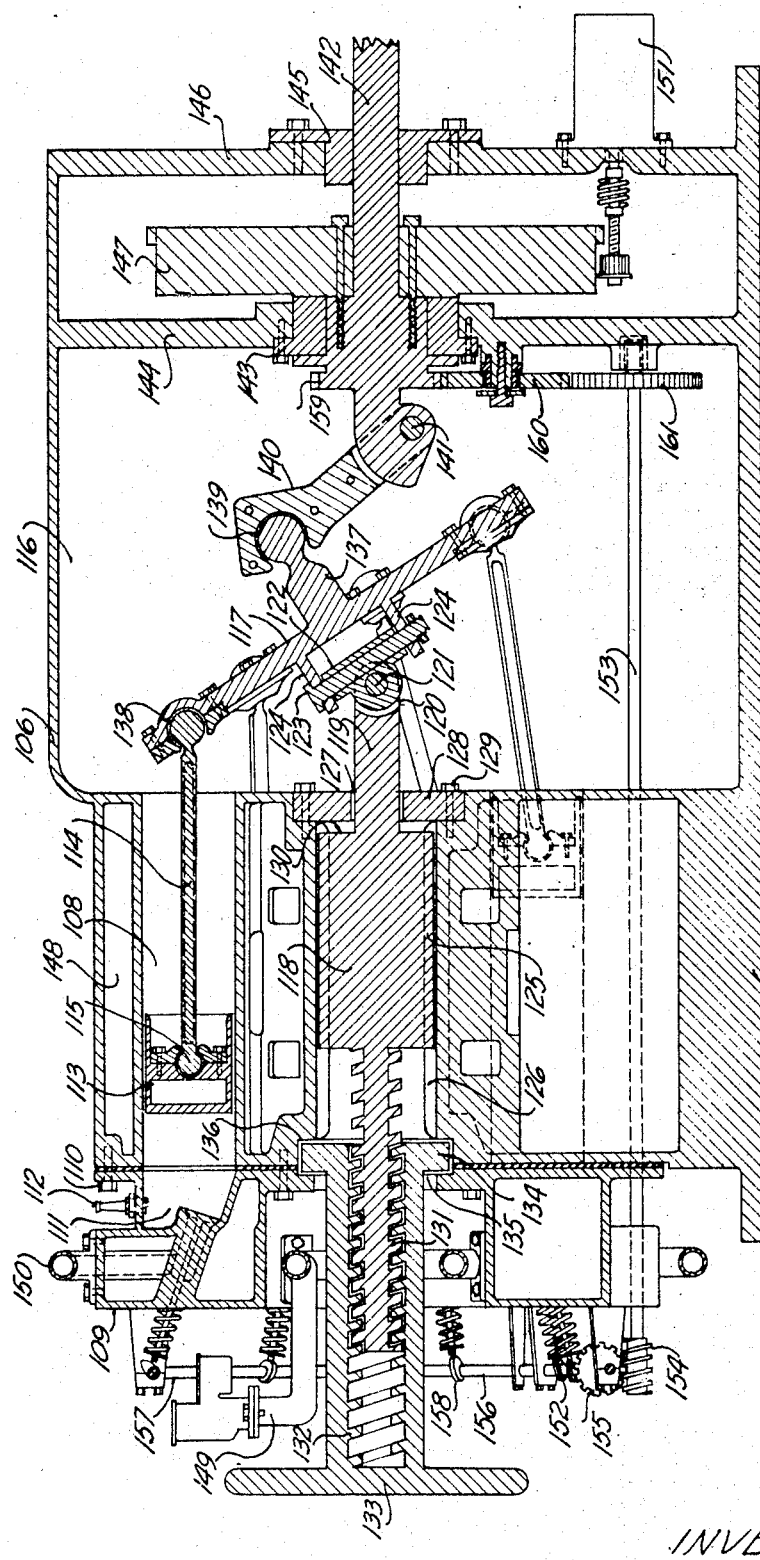

Patented Jan. 7, 1941

2,227,736

UNITED STATES PATENT OFFICE 2,227,736

INTERNAL COMBUSTION ENGINE

Herman E. Olson, Minneapolis, Minn.

Application May 4, 1939, Serial No. 271,739

27 Claims. (Cl. 123—48)

The present invention relates to an internal combustion engine.

This application is a continuation of my pending application Serial No. 122,965, for internal combustion engine, filed January 29, 1937, and adds various features and characteristics of construction to the disclosure of said mentioned application.

An object of the invention is to provide an internal combustion engine equipped with means through the instrumentality of which the strokes of pistons of said engine can be adjustably altered to thus controllably vary the intensity of the power impulse in harmony with the fuel consumed by the engine in direct proportion to the engine or horse-power output.

A further object is to provide an internal combustion engine equipped with means through the instrumentality of which the length of the strokes of pistons of said engine can be changed, either while the engine is stationary or is advancing at any of its various speeds, so that the engine or horse-power output and the quantity of fuel consumed can be varied and controlled directly in proportion to the intensity of the power impulses.

A further object is to provide an internal combustion engine equipped with adjustable means through the instrumentality of which a definite and proper relationship between the power output of the engine and the fuel consumed thereby can be created and maintained, whereby to attain maximum economy in fuel consumed for load carried, or work accomplished.

A further object is to provide an internal combustion engine equipped with means through the instrumentality of which the length of the strokes of the pistons of said engine can be relatively long for load starting purposes and when propelling heavy loads and can be comparatively shorter when propelling loads after they are set in motion.

A further object is to provide in an internal combustion engine, a construction and arrangement for transmitting the impulses from pistons through connecting rods oscillatably mounted upon the pistons, a member oscillatably carried by said connecting rods and a crank arm universally securing said oscillatable member directly to a rotatable shaft to be driven, the construction and arrangement also including means through the instrumentality of which the length of the strokes of the pistons can be adjustably altered to thus controllably vary the intensity of the power impulse in harmony with the fuel consumed by the engine in direct proportion to the engine or horse-power output.

A further object is to provide an internal combustion engine including cylinders with pistons arranged or grouped about the longitudinal axis of the engine, means through the instrumentality of which a steady and even succession of impulses for said pistons can be applied to a driven member in its direction of rotation, and means through the instrumentality of which the length of the strokes of the pistons can be adjustably altered to this controllably vary the intensity of the power impulse in harmony with the fuel of the power impulse in harmony with the fuel consumed and directly in proportion to the engine or horse-power output.

A further object is to provide an internal combustion engine including cylinders with pistons therein and means through the instrumentality of which the length of the strokes of said pistons can be adjustably shortened and lengthened in such manner that with shortening of the piston strokes said pistons will move to correspondingly higher top positions in the cylinders, or to positions providing smaller combustion areas, and with lengthening of the piston strokes said pistons will move to correspondingly lower top positions in said cylinders, or to positions providing larger combustion areas, whereby to provide the desired and proper compression ratio of gases in relation to length of piston stroke under all conditions of use of the engine, promote the maximum in economy of use of fuel, avoid overstressing of gases with attendant knocking, permit the use of economical fuels, control resistance on compression strokes, and generally increase engine efficiency.

A further object is to provide an internal combustion engine equipped with means through the instrumentality of which the length of the strokes of pistons and the volumes of combustion spaces of said engine can be adjustably altered, increased or decreased, in direct proportion to each other, with resultant production in said engine of different sets of volumes for said combustion spaces including a set of said volumes which is coincidental to, or a function of, each different length of strokes for said pistons designed to be accomplished by alteration of the length of the strokes of the pistons, to thus controllably vary the intensity of the power impulse in harmony with the fuel consumed by the engine in direct proportion to the engine or horsepower output, as well as with means through the instrumentality of which the relative values of each different length of strokes of said pistons and the set of volumes of said combustion spaces which is coincidental thereto, or a function thereof, can be adjustably altered to thus controllably vary the ratio of the magnitudes of said volumes of said combustion spaces and the lengths of said piston strokes under several different working conditions of said engine with the view of attaining maximum efficiency by the engine for all engine or horse-power outputs thereof.

A further object is to provide an internal combustion engine equipped with adjustable means through the instrumentality of which is definite and proper relationship between the power output of the engine and the fuel consumed thereby can be created and maintained, whereby to attain maximum economy in fuel consumed for load carried, or work accomplished, as well as with adjustable means through the instrumentality of which the ratio of the magnitudes of the lengths of the strokes or pistons and the volumes of combustion spaces of said engine can be controllably varied, whereby to attain maximum efficiency of the engine throughout a range of different engine or horse-power outputs thereof.

A further object is to provide in an internal combustion engine, a construction and arrangement for transmitting the impulses from pistons through connecting rods oscillatably mounted upon the pistons, a member oscillatably carried by said connecting rods and a crank member universally securing said oscillatable member directly to a rotatable shaft to be driven, the construction and arrangement also including means through the instrumentality of which the length of the strokes of the pistons can be adjustably altered to thus controllably vary the intensity of the power impulse in harmony with the fuel consumed by the engine in direct proportion to the engine or horse-power output, as well as means through the instrumentality of which the ratios of the magnitudes of the lengths of the strokes of said pistons and the volumes of combustion spaces of said engine can be controllably varied to thus attain maximum efficiency of said engine for different engine or horse-power outputs thereof.

A further object is to provide an internal combustion engine designed to provide an infinite series of variations in power output in harmony with different lengths of engine piston strokes and corresponding controlled alteration of combustion volume.

And a further object is to provide an internal combustion engine wherein will be incorporated various improved features and characteristics of construction novel both as individual entities of the engine and in combination with each other.

With the above objects in view, as well as others which will appear as the specification proceeds, the invention comprises the construction, arrangement and combination of parts as now to be fully described and as hereinafter to be specifically claimed, it being understood that the disclosure is merely illustrative and intended in no way in a limiting sense, changes in details of construction and arrangement of parts being permissible so long as within the spirit of the invention and the scope of the claims which follow.

In the accompanying drawings forming a part of this specification,

Fig. 3 is an enlarged longitudinal sectional view, taken substantially on line 3—3 in Fig. 1, or as on line 3—3 in Fig. 4, with parts omitted;

Fig. 3a is an enlarged longitudinal sectional view, taken substantially on line 3a—3a in Fig. 1, or as on line 3a—3a in Fig. 14;

Fig. 8 is a fragmentary transverse sectional view, taken substantially as on line 8—8 in Fig. 3a;

Fig. 9 is a detail view, partially in section and partially in elevation, taken substantially as on line 9—9 in Fig. 3a, with parts omitted;

Fig. 11 is a fragmentary transverse sectional view, taken substantially as on line 11—11 in Fig. 3a;

Fig. 12 is a detail view, taken substantially as on line 12—12 in Fig. 3a;

Fig. 13 is a transverse sectional view, taken substantially as on line 13—13 in Fig. 3a;

Fig. 14 is a fragmentary transverse sectional view, taken substantially as on line 14—14 in Fig. 3a;

Fig. 15 is a detail sectional view, taken substantially on line 15—15 in Fig. 13;

Fig. 16 is a detail sectional view, taken substantially on line 16—16 in Fig. 13;

Fig. 18 is a central, longitudinal sectional view of an internal combustion engine of further modified construction including features and characteristics of the invention.

Figure 2:
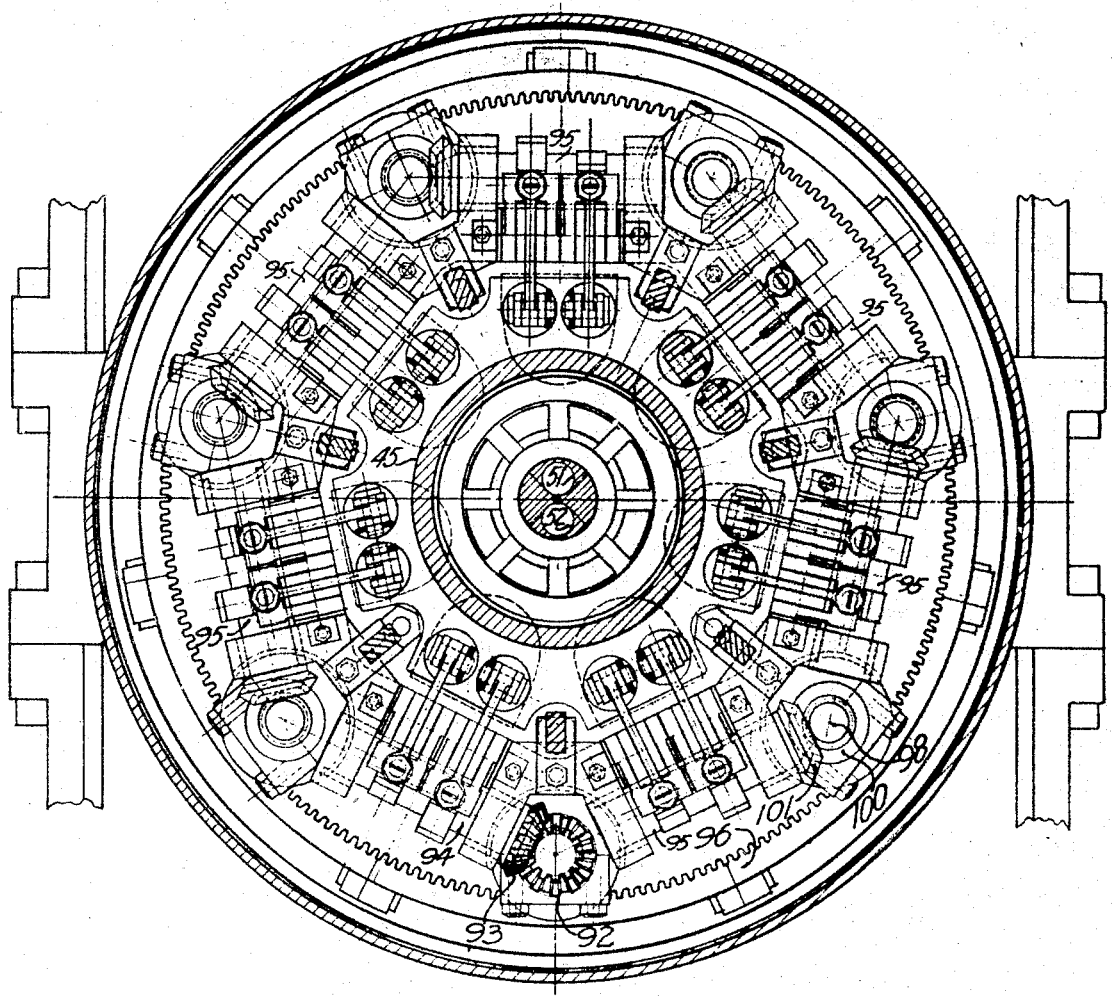
Fig. 2 is a transverse sectional view of said engine, taken substantially as on line 2—2 in Fig. 3.

The novel and improved internal combustion engine of the invention has been designed to operate without the conventional rotatable crank shaft. Instead, it is operated through the medium of an oscillatable member and a rotatable crank arm. The engine design is thus greatly simplified.

With respect to the drawings and the numerals of reference thereon, the body of the internal combustion engine is denoted 20, and a support for said body is represented 21. The body 20 includes horizontal cylinders 22, seven as shown, equally spaced about the longitudinal axis of the engine. As disclosed, the cylinders 22 are in a circumference common to all of said cylinders. Also, said cylinders are equivalently disposed between spaced apart, vertical planes, or planes extending transversely of the engine, common to all of the cylinders, and a head 23 for all of the cylinders is fastened upon the body 20 as at 24. The head 23 includes concavities 25, one for each cylinder 22, and said concavities 25 provide the upper portions of the compression or combustion spaces or chambers of the different cylinders, respectively. A usual spark plug set into each concavity 25 is indicated 26.

An ordinary piston 27 is slidably situated in each cylinder 22, and each piston 27 is oscillatably secured to a connecting rod 28 by means of a universal connection 29. Each of the universal connections 29 is a ball joint. The connecting rods 28 are all of equal length and each connecting rod extends downwardly from its corresponding piston through its corresponding cylinder. The lower end of each connecting rod 28 terminates within a chamber or case 30 of the engine adjacent the side of the cylinders 22 opposite the head 23, or below said cylinders in the sense that the head 23 is above the cylinders. Said chamber or case 30 is constituted as part of the body 20.

Figure 5:
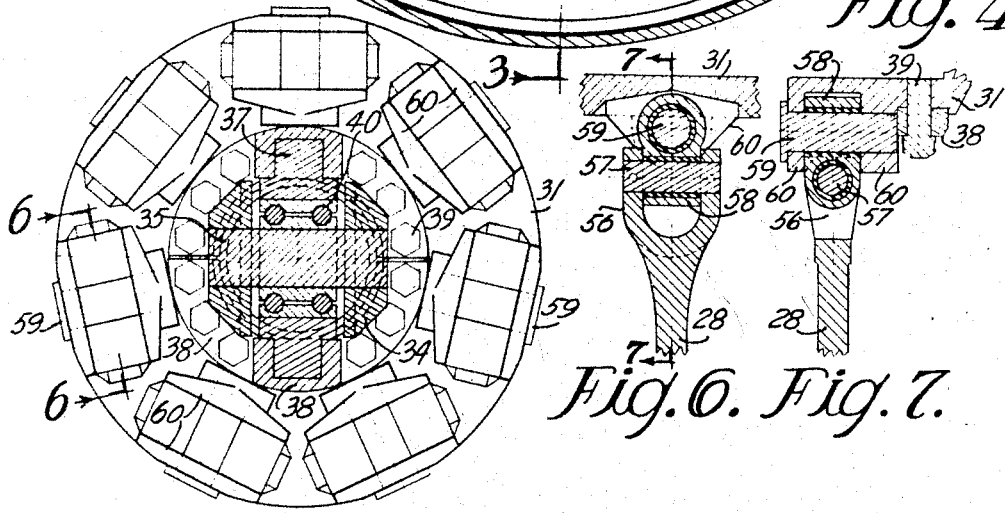
Fig. 5 is a detail sectional view, taken substantially as on line 5—5 in Fig. 3a, with parts omitted.

An oscillatable member 31 of the engine is constituted as a substantially flat disc as disclosed, although said oscillatable member could be otherwise constructed. A fulcrum or support 32 for the oscillatable member or disc 31 is disposed along the longitudinal axis of the engine in concentric relation to the cylinders 22 and their pistons 27. Said fulcrum or support 32 includes a portion or extension 33 thereof situated centrally in the part of the chamber or case 30 which is adjacent the cylinders 22, and said portion or extension 33 is universally secured to the center of the adjacent side or surface of the oscillatable member or disc 31. More explicitly, the portion or extension 33 includes spaced apart arms 34 at the end of the fulcrum or support in the chamber or case 30, and said spaced apart arms 34 receive the opposite end portions of a spindle or shaft 35 arranged in and oscillatably supporting a fitting or compound link 36. Said fitting or compound link 36 in turn oscillatably supports the member or disc 31 through the medium of spaced apart lugs 37 upon the fitting or compound link and arranged in and oscillatably supporting spaced apart ears 38 secured upon said member or disc 31 as at 39. Desirably, the construction includes a ball bearing support 40 for the fitting or compound link 36 arranged upon and in surrounding relation to the spindle or shaft 35. The spindle of shaft 35 and the line of the lugs 37 are as illustrated perpendicular to each other, and the axes of said spindle or shaft and said lugs intersect. See Figs. 3a and 5.

Figure 1:
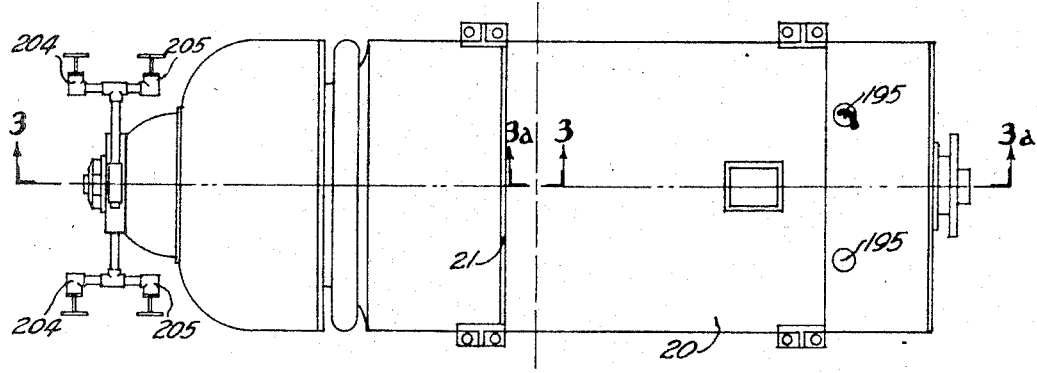
Fig. 1 is an elevational plan view of an internal combustion engine including the principles of the invention.
Figure 4:
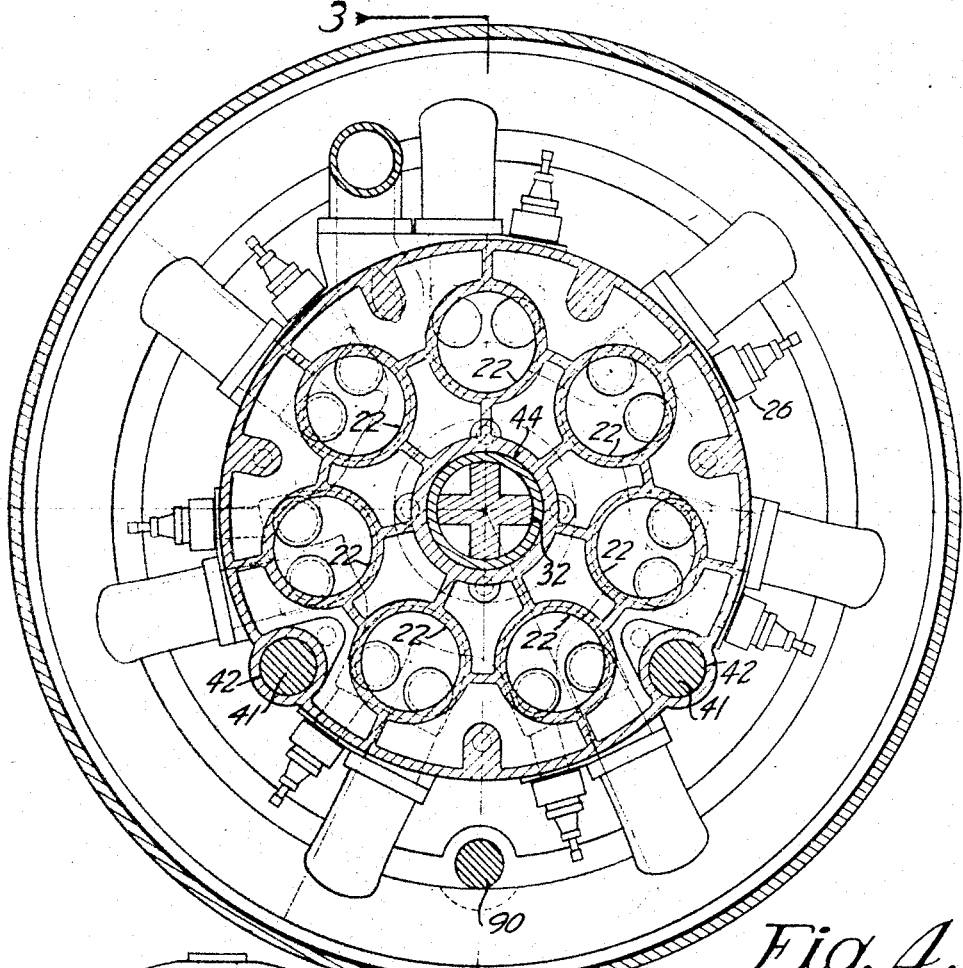
Fig. 4 is a transverse sectional view, taken substantially as on line 4—4 in Fig. 3.
Figures 6, 7:
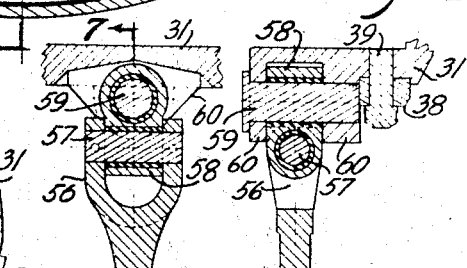
Fig. 6 is a detail sectional view, taken substantially on line 6—6 in Fig. 5.
Fig. 7 is a detail sectional view, taken substantially as on line 7—7 in Fig. 6.

The fulcrum or support is snugly slidable longitudinally in a way 44 through the body 20 of the engine, and as illustrated is fixed against turning or rotative movement in said engine body by a series of guide rods 41 snugly slidable in longitudinal ways 42 through the engine body. Said fulcrum or support 32 and said guide rods 41 are made rigid with each other by an attachment member 43 secured to the portion or extension 33 of the fulcrum or support and to adjacent end portions of the guide rods 41 disposed within the chamber or case 30. See Figs. 1 and 4. The arrangement as illustrated and described effectively provides for the accomplishment of exact longitudinal movement of said fulcrum or support when adjusted in a manner to be made clear.

The fulcrum or support 32 is carried at its end portion opposite the portion or extension 33 by a hydraulic container 45 situated adjacent the end of the cylinder head 23 opposite the cylinders 22, within a cover support 46 which can be considered as a part of, or complemental to, the engine body 20. That is, the cover support 46 cooperates with the body 20 and with the cylinder head 23 to house the hydraulic container 45, as well as to house additional elements of the internal combustion engine. A piston rod 47 is slidably fitted in fluid-tight manner, as at 48, in a wall of the container 45 opposite the fulcrum or support 32, and said piston rod is rigid with a piston 49 situated within said container. The piston rod 47 extends outwardly away from the container 45, and the end of said piston rod which is opposite the piston 49 is rigidly fixed, as at 50, to the cover support 46. The piston rod 47 is longitudinally alined with the fulcrum or support 32. Inlet and outlet ports, denoted 51 and 52, respectively, separately communicate with the spaces of the hydraulic container 45 at opposite sides of the piston 49. Each of the ports 51 and 52 extends longitudinally through the piston rod 47, as well as through the piston 49, portions 53 of the cover support 46 and pipe fittings 54 secured upon said cover support. It will be evident that by application of pressure within the hydraulic container 45 at either side of the piston 49, the fulcrum or support 32 can be longitudinally adjusted, to be moved toward or away from the oscillatable member or disc 31, depending upon whether the pressure is applied at one side or the other of said piston 49. That is, the universal mounting between the fulcrum or support 32 and the oscillatable member or disc 31 can be selectively adjusted, toward or away from the cylinders 22, in the chamber or case 30 by application of pressure within the hydraulic container 45 against the piston 49, and said universal mounting is adapted to remain at any position to which set.

The side or surface of the oscillatable member or disc 31 opposite the fulcrum or support 32 includes an integral, outwardly extending actuator or drive member 55 which is disposed centrally of said oscillatable member or disc 31 and is arranged perpendicular thereto. Naturally, the universal connection between the fulcrum or support 32 and the oscillatable member or disc 31 being arranged centrally of said oscillatable member or disc at one of its sides or surfaces and the actuator or drive member 55 being arranged centrally of the oscillatable member or disc at its opposite side or surface, said mentioned universal connection and said actuator or drive member 55 are directly opposite each other with respect to said oscillatable member or disc 31.

The end of each connecting rod 28 opposite the corresponding piston 27 is universally secured to the oscillatable member or disc 31. More explicitly, each connecting rod 28 includes spaced apart ears 56 which receive the opposite end portions of a spindle or shaft 57 arranged in an oscillatably supporting a fitting or compound link 58. Each fitting or compound link 58 in turn is oscillatably mounted upon the member or disc 31 through the medium of a spindle or shaft 59 in the corresponding fitting or compound link 58 and having its opposite end portions arranged in and oscillatably carried by spaced apart ears 60 rigid with said member or disc 31. The spindles or shafts 57 and 59 are as illustrated disposed perpendicularly to each other and in adjacent relation. See Figs. 3a, 5, 6 and 7. All of the universal connections between the connecting rods 28 and the oscillatable member or disc 31 are disposed in concentric relation to the universal connection between the fulcrum or support 32 and said oscillatable member or disc 31, as well as in concentric relation to the actuator or drive member 55.

The end portion of the actuator or drive member 55 spaced from the oscillatable member or disc 31 is slidably and universally; that is, both rotatably and oscillatably secured, as indicated generally at 61, to a crank member 62 constituted as a curved element 63 and a crank arm 64 rigid with said curved element.

The crank arm 64 is disposed substantially perpendicularly of the longitudinal axis of the fulcrum or support 32, and is secured to a power shaft 65 adapted to be driven. More accurately, the crank arm 64 is rigidly secured, as denoted generally at 66, to an ordinary fly wheel 67 suitably and conveniently fixed, as at 68, upon said power shaft. As disclosed, the power shaft 65 is disposed in longitudinal alinement with the fulcrum or support 32 and is rotatably mounted, as at 69, in the engine body, of course against the possibility of longitudinal movement in said body. An end portion of said power shaft 65 opposite the fly wheel 67 is rigid with a member 70 to be driven, which member 70 is at the outer side of the engine body and opposite the cover support 46 as disclosed. More explicitly, the rigid union 66 between the crank arm 64 and the fly wheel 67 is constituted as a hinge joint 71 at one side of the power shaft 65 and a special rigid connection 72 at the opposite side of said power shaft, so that said crank arm can be adjusted in a manner and for a purpose hereinafter fully set forth. To the accomplishment of functions of the internal combustion engine now under consideration, however, it is sufficient to state that the crank arm 64 may be substantially perpendicular to the power shaft 65, or in oblique relation to said power shaft, and that said crank arm is rigidly secured to the fly wheel 67 in driving relation thereto. Said fly wheel is rigid with the power shaft and is driven or rotated in response to actuation of the crank arm 64.

The curved element 63 is disposed in spaced relation to the crank arm 64, between said crank arm and the oscillatable member or disc 31, and the rotatable and oscillatable and slidable connection, hereinbefore mentioned, between the actuator or drive member 55 and the crank member 62 is as illustrated between said actuator or drive member and the curved element 63 of said crank member. More explicitly, said curved element 63 is at one side of the common longitudinal axis of the fulcrum or support 32 and the power shaft 65. As disclosed, the curved element 63 is constructed to provide oppositely disposed, upwardly and inwardly extending channels or guide ways 77 to which oppositely disposed, longitudinally curved flanges 74 upon a yoke 75 are suitably and conveniently slidably fitted. The yoke 75 is desirably reinforced by a transverse strengthening member 76. Said yoke 75 is suitably and conveniently oscillatably secured upon trunnions 78 rigid with a thrust bearing member 79 and situated in opposed relation to each other upon said thrust bearing member. The thrust bearing member 79 rotatably supports the actuator or drive member 55, as by employment of a ball bearing 80 suitably mounted in said thrust bearing member in surrounding relation to the actuator or drive member. The thrust bearing member can be arranged upon the actuator or drive member to be immovable longitudinally thereof in and suitable and convenient manner, as represented generally at 81.

The thrust bearing member 79 and the yoke 75 constitute means between the actuator or drive member 55 and the crank member 62, or more accurately, the curved element 63 of said crank member, for applying power exerted at said actuator or drive member to the power shaft 65. The arrangement of the actuator or drive member 55 with thrust bearing member and yoke 75 relatively to the guide ways 77 is such that adjustment of the fulcrum or support 32 in direction away from said cylinders 22 will cause said actuator or drive member with thrust bearing member and yoke to be moved along the guide ways 77 in direction away from the axis of the power shaft 65 and that adjustment of said fulcrum or support in direction toward said cylinders 22 will cause the actuator or drive member with thrust bearing member and yoke to be moved along said guide ways 77 in direction toward said axis of the power shaft. The construction is such that for any fixed adjustment of the fulcrum or support 32 the thrust bearing member 79 and yoke 75 will stably remain at fixed relation to the guide ways 77; that is, said thrust bearing member and yoke will be retained at any position to which adjusted along the length of said guide ways 77 by longitudinal adjustment of the fulcrum or support 32.

A cooling jacket for the engine is represented generally at 82, an intake manifold is denoted 83, and an exhaust manifold is indicated 84. The cooling jacket and the intake and exhaust manifolds can be of ordinary or preferred construction. It should be remarked, however, that because of the location of the cylinders around a common axis or center, the carburetion problem is greatly simplified. The intake manifold arrangement as illustrated permits the ingress of gas or fuel to all cylinders over comparatively short distances from a common gas or fuel supply. The fuel or gas is required to travel the same distance from the intake manifold proper to each of the cylinders.

A self-starter for the engine is denoted generally at 85, and can be of ordinary or preferred construction. As illustrated, the self-starter 85 is suitably and conveniently situated and supported in the engine body, and is operative upon the fly wheel 67 through the instrumentality of a usual starter-pinion 86 upon a driven shaft 87 of said self-starter and adapted to be thrown into and out of mesh with a ring gear 88 fixed about the circumference of said fly wheel.

Intake and exhaust valves for the various cylinders are represented generally at 89. Said intake and exhaust valves may be of ordinary or preferred construction. As disclosed, the intake and exhaust valves are actuated through the medium of a driving connection, denoted generally at 90, consisting of a plurality of substantially longitudinally extending, properly connected shafts suitably and conveniently mounted in bearings 91 provided upon the engine body 20 and the cover support 46. A bevel gear 92 fixed upon one end of the driving connection 90 drives a bevel gear 93 fixed upon a transverse shaft 94. Additional transverse shafts 95 are suitably and conveniently driven through the medium of a ring gear 96 which is situated within the cover support 46 and is revolvably mounted upon said cover support in any suitable and convenient manner. The ring gear 96 is adapted to be driven by a gear 97 fixed upon a shaft of the driving connection 90, and said ring gear 96 is adapted to drive each of said additional transverse shafts 95 through the medium of relatively short, longitudinally extending shafts 98, one for each transverse shaft 95. The ring gear 96 meshes with a gear, or gears, 99 fixed upon each of the short shafts 98, and a bevel gear 100 fixed upon an end of each of said short shafts 98 meshes with a bevel gear 101 fixed upon an end of each of said additional transverse shafts 95. The transverse shafts 94 and 95 actuate ordinary or preferred cams, such as 102, adapted to in turn actuate all of the necessary intake and exhaust valves 89 in ordinary and well known manner. The shafts 94, 95 and 98, and the mechanisms actuated thereby, are situated within the cover support 46 and are suitably and conveniently mounted upon or carried by said cover support. The driving connection 90 is driven from the power shaft 65 through the medium of a gear 103 fixed upon the hub of the fly wheel 67, an idler gear 104 suitably mounted upon the engine body and with which the gear 103 meshes, and a gear 105 fixed upon one of the shafts of said driving connection 90 and with which said idler gear meshes. See Figs. 2, 3, 3a, 4 and 14.

The order of succession of firing, or work strokes of the pistons 27, in the several different cylinders 22 will be such that the member or disc 31 will be oscillated so that the actuator or drive member 55, and the rotatable and universal connection between said actuator or drive member and the curved element 63 of the crank member 62 will be moved in a circle or circumference about the axis of the power shaft 65. That is, the thrust bearing member 79 will be moved in a vertical plane through a complete circumference, or rotated, about the horizontal axis of said power shaft 65, and the power shaft will be driven or rotated through the medium of the crank member 62. Evidently, as the firing or work strokes successively occur, a steady and even succession of impulses from the pistons 27 will be applied to the driven power shaft 65 in its direction of rotation. Each piston 27 during its working stroke will tilt or rock the oscillatable member or disc 31 so as to advance the thrust bearing member 79 in its movement of rotation, and as a piston 27 commences an upstroke following a work stroke, another or succeeding piston 27 will start its work stroke and take up the tilting or rocking of said oscillatable member or disc 31 to advance said thrust bearing member 79 in its movement of rotation from the position in which the thrust bearing member was left when a preceding piston 27 finished its work stroke. Stated differently, actuations of the pistons 27 will cause the member of disc 31 to be oscillated about each of the axes of the universal connection between the fulcrum or support 32 and said member or disc 31, and, as a consequence, cause the actuator or drive member 55 to be rotated in a circle or circumference lying substantially in a vertical plane, or in a plane substantially at right angles to the axis of the power shaft 65. The stages of rotation will be progressive, each piston 27 during its work stroke applying an even and steady impulse which will be one of an even succession of impulses applied to the power shaft 65 by advancing the thrust bearing member 79 at uniform speed for fixed distances in its movement of rotation. As each preceding piston 27 finishes its work stroke, another or succeeding piston 27 smoothly continues the application of the steady and even succession of impulses to the power shaft 65 by advancing the thrust bearing member 79 at uniform speed for a further fixed distance in its movement of rotation.

The overall length of the strokes of the pistons 27 is proportionately decreased with adjustment of the universal connection between the fulcrum or support 32 and the oscillatable member or disc 31 in direction toward the engine cylinders 22, and said overall length of the strokes of said pistons 27 is proportionately increased with adjustment of said universal connection between said fulcrum or support 32 and said oscillatable member or disc 31 in direction away from said engine cylinders, for the reason that adjustment of the actuator or drive member 55 toward the engine cylinders causes the thrust bearing member 79 to be moved inwardly toward the common axis for the fulcrum or support 32 and the power shaft 65, and adjustment of said actuator or drive member 55 away from said engine cylinders causes said thrust bearing member 79 to be moved outwardly away from said common axis for said fulcrum or support 32 and said power shaft 65. The magnitude of the circle or circumference in which the thrust bearing support 79 travels in response to actuations of the pistons 27 will obviously depend upon the distance at which said thrust bearing member is situated from the axis of the power shaft 65, the circle or circumference of rotation decreasing in magnitude as the thrust bearing member 79 is moved inwardly and increasing in magnitude as said thrust bearing member is moved outwardly. In turn, the length of the strokes of the pistons 27, evenly balanced about the fulcrum or support 32 and secured to the oscillatable member or disc 31 by the connecting rods 28, will evidently be predetermined by and a function of the magnitude of the circle or circumference of rotation of the actuator or drive member 55 and the thrust bearing member 79 thereon. In short, with decrease of the magnitude of the circle or circumference of rotation of said actuator or drive member 55 with thrust bearing member 79 the length of the strokes of the pistons 27 will be decreased, and with increase of the magnitude of the circle or circumference of rotation of the actuator or drive member 55 with thrust bearing member 79 the length of the strokes of said pistons 27 will be increased.

Obviously, by adjustable alteration of the strokes of the pistons 27, the fuel consumed by the engine can be controllably varied in proportion to the amount of power consumed. Adjustment of the actuator or drive member 55 can be accomplished either while the engine is at rest or is operating at any of its speeds, and by simple adjustment of said actuator or drive member 55 the engine or horse-power output and the quantity of fuel consumed can be varied and controlled directly in proportion to load carried by the engine. The construction and arrangement as illustrated and described makes provision whereby a definite and proper relationship between the intensity of the power impulse and the fuel consumed and the power output of an engine can be created and maintained. The evident ultimate result is tendency toward obtaining the maximum economy in fuel consumed for load carried, or work accomplished.

By adjustment of the actuator or drive member 55 with thrust bearing member 79 in direction away from the engine cylinders 22 the lengths of the strokes of the pistons 27 can be relatively lengthened to be made powerful for load starting purposes, and by adjustment of said actuator or drive member 55 with thrust bearing member 79 in direction toward said engine cylinders 22 the length of the strokes of said pistons 27 can be comparatively shortened to be made less powerful to propel loads already set in motion.

An internal combustion engine made according to the principles of the invention can include an even or an uneven number of cylinders each with piston, the engine as disclosed and as above described including seven cylinders 22. By employment of an uneven number of cylinders in an internal combustion engine a quite effective overlap of power impulses is possible.

Attention is specifically called to the fact that an engine constructed in agreement with the teachings of the present invention will include the inherent capacity for movement of the pistons to correspondingly higher top positions, so-called, in the cylinders, or to positions providing smaller combustion spaces or volumes, with shortening adjustment of the length of the strokes of said pistons, and for movement of the pistons to correspondingly lower top positions, so-called, in said cylinders, or to positions providing larger combustion spaces or volumes, with lengthening adjustment of the length of the strokes of the pistons. Thus there is provision for desired and proper compression ratio of gases in the compression or combustion chambers in relation to length of piston stroke for all conditions of use of the engine, with tendency toward economical use of fuel and avoidance of overstressing of gases and knocking. Economical fuels can be utilized, and resistance on compression strokes can be nicely controlled. On the whole, the construction and arrangement makes provision for general increase of engine efficiency. When an engine made according to the invention takes in a heavier charge to create a heavier impulse, provision is included, because of the longer stroke, to give that impulse a longer distance to travel over to exert its pressure, and vice versa.

While the novel and improved internal combustion engine provides an infinite series of variations in power output in harmony with different lengths of engine piston stroke and corresponding controlled alteration of compression or combustion area, it is at the same time of more simple and compact design than are internal combustion engines now of commerce. Many costly parts and costly machine operations necessary to the production of ordinary internal combustion engines of general types heretofore known are not required to the production of an engine according to the present invention. The universal connections of an engine made by following the invention, and especially the universal connection which unites the actuator or drive member 55 with the crank member 62, or an equivalent of said last mentioned universal connection, present no problems of alinement, liability of probable damage due to side pressures, or other problems or liabilities in the nature of those presented when manufacturing ordinary internal combustion engines of general nature as now customarily employed to use. The power shaft 65 is merely a common straight shaft which is stably mounted and not at all liable to become displaced or unduly worn even after long usage.

Obviously, the principles of the invention are applicable to other motive agencies, such as steam, air or other gases under pressure, etc.

In Fig. 18 there is illustrated an internal combustion engine of modified construction including the features and characteristics of the invention as hereinbefore recited, and the engine of Fig. 18 functions, or is operative, substantially in the manner as already set forth.

With respect to Fig. 18, the body of the internal combustion engine there disclosed is denoted 106, and a support for said body is represented 107. The body 106 includes horizontal cylinders 108 equally spaced apart about the longitudinal axis of the engine. Desirably the cylinders 108 will be in a single circumference and in a single vertical plane. A single head 109 for all of the cylinders 108 is fastened upon the engine body 106 as at 110. The head 109 includes concavities 111, one for each engine cylinder 108, and said concavities 111 provide the upper portions of the compression or combustion spaces or chambers of the different cylinders, respectively. A usual spark plug set into each concavity 111 is indicated 112.

An ordinary piston 113 is slidably situated in each cylinder 108, and each piston 113 is oscillatably secured to a connecting rod 114 by means of a universal connection 115. Each universal connection 115 is a ball joint. The connecting rods 114 are all of equal length and each connecting rod 114 extends downwardly so-called, from its corresponding piston through its corresponding cylinder. The lower or outer end of each connecting rod 114 terminates within a chamber or case 116 of the engine below the cylinders 108, or at the side of said cylinders 108 opposite the head 109. The chamber or case 116 is constituted as a part of the engine body 106.

An oscillatable member 117 of the engine is constituted as a flat disc as disclosed, although said oscillatable member could be otherwise constructed. A fulcrum or support 118 for the oscillatable member or disc 117 is disposed along the longitudinal axis of the engine in concentric relation to the cylinders 108 and their pistons 113. Said fulcrum or support 118 includes a reduced end portion or extension 119 thereof situated centrally in the adjacent part of the chamber or case 116, and said portion or extension is universally secured to the center of the adjacent side or surface of the oscillatable member or disc 117. More explicitly, the portion or extension 119 includes spaced apart ears 120 which extend in direction away from the engine cylinders 108, and said ears 120 receive the opposite end portions of a bolt 121 arranged in and oscillatably supporting a fitting or compound link 122. Said fitting or compound link 122 in turn oscillatably supports the member of disc 117 through the medium of a headed and nutted bolt 123 in the fitting or compound link and having its opposite end portions arranged in and oscillatably supporting spaced apart, upwardly projecting ears 124 upon said member or disc 117. The bolts 121 and 123 are as illustrated disposed perpendicularly to each other and in adjacent relation.

The fulcrum or support 118 is longitudinally slidable in the engine body 106, and desirably includes spaced apart, longitudinally extending ribs or flanges 125 which are arranged in longitudinal guide ways 126 of the engine body. The ribs or flanges 125 and their arrangement in the guide ways 126 preclude the possibility of turning movement of the fulcrum or support 118 in the engine body, and the arrangement as illustrated and described effectively provides for the accomplishment of exact longitudinal movement of said fulcrum or support 118 when adjusted. The reduced portion or extension 119 of the fulcrum or support 118 passes through an opening 127 in a plate 128 secured to the engine body, as at 129, below an annular shoulder 130 of said fulcrum or support adjacent said reduced portion or extension 119. Said plate 128 is for the obvious purpose of limiting the extent of movement of the fulcrum or support 118 in direction away from the engine cylinders 108 and toward the chamber or case 116.

The fulcrum or support 118 includes an integral reduced, externally threaded member 131 which extends through the head 109 from the center of the adjacent surface of said fulcrum or support 118. The end portion of the reduced, externally threaded member 131 opposite the portion or extension 119 is adjustably received in an internal thread 132 of a rotatable hand or finger piece 133. Said hand or finger piece 133 is disposed in longitudinal alinement with the fulcrum or support 118 and the externally threaded member 131. The outer portion of the rotatable hand or finger piece 133 is disposed at the outer side of the head 109, and the inner end of said hand or finger piece includes an annular vertical, outwardly extending flange 134 situated at the inner side of a cut-out portion 135 of said head 109 and rotatably supported upon an annular, vertical shoulder 136 of the engine body disposed at the inner side of said flange 134 and in surrounding relation to the adjacent end of the longitudinal guide ways 126 of said engine body for the fulcrum or support 118. It will be evident that by rotation of the head or finger piece 133, said fulcrum or support 118 and its reduced portion or extension 119 with the spaced apart ears 120 can be longitudinally adjusted, toward or away from the engine cylinders 108, depending upon the direction of rotation of said hand or finger piece. That is, the universal connection between the fulcrum or support 118 and the oscillatable member or disc 117 can be selectively adjusted, toward or away from the engine cylinders, in the chamber or case 116 by rotative movement of the hand or finger piece 133, and said universal connection will remain at any position to which set.

The side or surface of the oscillatable member or disc 117 which is opposite the fulcrum or support 118 includes an integral, outwardly extending actuator or drive member 137 which is disposed centrally of said oscillatable member or disc 117 and is arranged perpendicular thereto. The universal connection between the fulcrum or support 118 and the oscillatable member or disc 117 being arranged centrally of said oscillatable member or disc at one of its sides or surfaces and the actuator or drive member 137 being arranged centrally of the oscillatable member or disc 117 at its opposite side or surface, said mentioned universal connection and said actuator or drive member 137 are directly opposite each other with respect to said oscillatable member or disc 117.

The lower or outer end of each connecting rod 114 is universally secured, as at 138, to the oscillatable member or disc 117. Each of the universal connections 138 is a ball joint and all of the ball joints 138 are disposed in concentric relation to the universal connection between the fulcrum or support 118 and the oscillatable member or disc 117, as well as in concentric relation to the actuator or drive member 137.

The end of the actuator or drive member 137 spaced from the oscillatable member or disc 117 is universally secured, as at 139, to one end portion of a crank arm 140. The universal connection 139 is a ball joint. Said crank arm 140 is disposed substantially vertically, or obliquely to the vertical, depending upon the longitudinal adjustment of the fulcrum or support 118, and the end of the crank arm 140 opposite said actuator or drive member 137 is secured, as at 141, for pivotal movement in a plane extending longitudinally of the engine relative to a horizontally or longitudinally extending power shaft 142 adapted to be driven. An inner portion of the power shaft 142 is rotatably mounted, as at 143, in a reinforcement member 144 of the engine body 106, and an outer portion of said power shaft 142 is rotatably mounted, as at 145, in a reinforcement member 146 of said engine body. An ordinary fly wheel, upon the power shaft 142 and between the reinforcement members 144 and 146, is denoted 147.

A cooling jacket for the engine is represented generally at 148, an intake manifold is denoted 149 and an exhaust manifold is indicated 150. The cooling jacket 148 and the intake and exhaust manifolds 149 and 150 can be of ordinary or preferred construction.

A self-starter for the engine is denoted generally at 151, and can be of ordinary or preferred construction. As illustrated, the self-starter is operative upon the fly wheel 147.

Intake and exhaust valves for the various cylinders 108 are represented generally at 152. Said intake and exhaust valves may be of ordinary or preferred construction. As disclosed, the intake and exhaust valves 152 are actuated through the medium of a longitudinally extending shaft 153. A worm 154 upon an end of said longitudinal shaft 153 drives a worm wheel 155 upon a transverse shaft 156 suitably mounted upon the engine body. Additional transverse shafts 157 are driven from said shaft 156, and the shafts 156 and 157 include ordinary cams 158 for actuating all of the necessary intake and exhaust valves 152 in ordinary and well known manner. The longitudinal shaft 153 is driven from the power shaft 142 through the medium of a gear 159 fixed upon said power shaft, an idler gear 160 mounted upon the engine body and with which the gear 159 meshes, and a gear 161 fixed upon said longitudinal shaft 153 and with which said idler gear meshes.

The order of succession of firing of the pistons 113 in the cylinders 108 will be such that the member or disc 117 will be oscillated so that the actuator or drive member 137, and the universal joint 139 will be moved in a circle or circumference about the axis of the power shaft 142. That is, the ball joint 139 will be moved in a vertical plane through a complete circumference, or rotated, about the axis of said power shaft 142, and the power shaft will be driven or rotated through the medium of the crank arm 140. As the firing or work strokes successively occur, a steady and even succession of impulses from the pistons 113 will be applied to the driven power shaft 142 in its direction of rotation. Each piston 113 during its work stroke will tilt or rock the oscillatable member or disc 117 so as to advance the ball joint 139 in its movement of rotation, and as a piston 113 commences an upstroke following a work stroke, another or succeeding piston 113 will start its work stroke and take up the tilting or rocking of said oscillatable member or disc 117 to advance said ball joint 139 in its movement of rotation from the position in which the ball joint was left when a preceding piston 113 finished its work stroke. That is, actuations of the pistons 113 will cause the member or disc 117 to be oscillated about each of the axes of the universal connection between the fulcrum or support 118 and said member or disc 117, and the actuator or drive member 137 to be rotated in a circle or circumference lying in a vertical plane. The stages of rotation will be progressive, each piston during its working stroke applying a steady and even succession of impulses to the power shaft 142 by advancing the ball joint 139 at uniform speed for a fixed distance in its movement of rotation. As each preceding piston 113 finishes its work stroke, another or succeeding piston 113 smoothly continues the application of the steady and even succession of impulses to the power shaft 142 by advancing the ball joint 139 at uniform speed for a further fixed distance in its movement of rotation.

The overall length of the strokes of the pistons 113 is proportionately decreased with adjustment of the universal connection between the fulcrum or support 118 and the oscillatable member or disc 117 in the chamber or case 116 toward the cylinders 108, and said overall length of the strokes of said pistons 113 is proportionately increased with adjustment of said universal connection in said chamber or case away from said cylinders, for the reason that adjustment of the actuator or drive member 137 toward the cylinders 108 causes the crank arm 140 to be swung toward said cylinders about the pin 141 as an axis, away from the vertical, and the universal, ball joint 139 as a result to be moved closer to the axis of the power shaft 142, and adjustment of said actuator or drive member 137 away from said cylinders 108 causes said crank arm 140 to be swung away from the cylinders about said pin 141 as an axis, toward the vertical, and said universal, ball joint 139 as a result to be moved farther from the axis of said power shaft 142. The magnitude of the circle or circumference in which the universal joint 139 travels in response to actuations of the pistons 113 will depend upon the distance at which said universal joint 139 is situated from the axis of the power shaft 142, the circle or circumference of rotation decreasing in magnitude as the universal joint 139 is moved inwardly and increasing in magnitude as said universal joint is moved outwardly. In turn, the length of the strokes of the pistons 113, evenly balanced about the fulcrum or support 118 and secured to the oscillatable member or disc 117 by the connecting rods 114, will evidently be predetermined by and a function of the magnitude of the circle or circumference of rotation of the actuator or drive member 137 and said universal joint 139. In short, with decrease of the magnitude of the circle or circumference of rotation of said actuator or drive member 137 the length of the strokes of the pistons 113 will be decreased, and with increase of the magnitude of the circle or circumference or rotation of the actuator or drive member 137 the length of the strokes of said pistons 113 will be increased.

It will be evident that the internal combustion engine of Fig. 18 will function, or be operative, in the general manner as hereinbefore fully set forth. The fuel consumed by said engine can be controllably varied in proportion to the amount of power consumed by adjustable alteration of the strokes of the pistons 113. Longitudinal adjustment of the actuator or drive member 137 can be accomplished either while the engine is at rest or is in motion and operating at any of its different speeds. Adjustment of said actuator or drive member 137 can be employed to vary and control the engine or horse-power output and the quantity of fuel consumed directly in proportion to load carried by said engine. And the present construction and arrangement includes provision for creating and maintaining a definite and proper relationship between the intensity of the power impulse and the fuel consumed and the power output of the engine. By lengthening of the strokes of the pistons 113 said strokes can be made powerful for load starting purposes, and by shortening of the strokes of said pistons said strokes can be made less powerful to propel loads which are in motion.

The internal combustion engine of Fig. 18 can include an even or an uneven number of cylinders 108 each with piston 113, and said engine of Fig. 18 possesses the inherent capacity for movement of the pistons 113 to positions in the cylinders 108 providing smaller combustion spaces or volumes with shortening adjustment of the length of the strokes of said pistons 113, and for movement of the pistons to positions in the cylinders providing larger combustion spaces or volumes with lengthening adjustment of the length of the strokes of said pistons. In operation, the internal combustion engine now under consideration has provision for desired and proper compression ratio of gases in its compression or combustion chambers in relation to length of piston stroke for all conditions of use of the engine, as well as provision for giving a heavier power impulse, created by intake of a heavier charge of fuel, a longer distance to travel over to exert its pressure, and a lighter power impulse, created by intake of a lighter charge of fuel, a shorter distance to travel over to exert its pressure.

In addition to the construction and arrangement, or means, as hereinbefore described, through the instrumentality of which the length of the strokes of pistons and the volumes of combustion spaces of an internal combustion engine made according to the invention can be adjustably altered, increased or decreased, in direct proportion, and, naturally in fixed ratio, to each other, to thus produce in said engine different sets of volumes for said combustion spaces; obviously including a set of said volumes which is coincidental to, or a function of, each different length of strokes for said pistons designed to be accomplished by alteration of the length of the strokes of the pistons; the invention presents a construction and arrangement, or means, adapted for employment in an internal combustion engine having the general features and characteristics as already set forth, through the instrumentality of which the relative values of each different length of strokes of said pistons and the set of volumes of said combustion spaces which is coincidental thereto, or a function thereof, as aforesaid, can be adjustably altered to thus controllably vary the ratio of the magnitudes of said volumes of said combustion spaces and the lengths of said piston strokes under several different working conditions in an engine conforming to the invention, with the end in view of attaining maximum efficiency by the engine for all, or several different, engine or horse-power outputs thereof. Stated differently, the disclosure herein includes a construction and arrangement through the medium of which the ratios of the magnitudes of the lengths of the strokes of pistons and the volumes of combustion spaces of an internal combustion engine possessing general characteristics as hereinbefore outlined; that is, including a construction and arrangement through the medium of which the length of the strokes of pistons and the volumes of combustion spaces of the engine can be adjustably altered, in direct proportion the one to the other, to inherently provide in said engine a set of volumes for said combustion spaces which is, in magnitude and actually, coincidental to, or a function of, each different length of strokes for said pistons and the magnitude thereof; can be controllably varied with the aim of attaining maximum efficiency of the engine for different engine or horse-power outputs thereof by adjustable alteration of the relative values of each different length of strokes of said pistons and the set of volumes of said combustion spaces which inherently is coincidental thereto, or a function thereof.

The construction and arrangement, or means, designated 162 for convenience, of the invention for adjustably altering the relative values of each different length of the strokes of the pistons 27 and the set of volumes of the combustion spaces of the cylinders 22 which is coincidental thereto, or a function thereof, is illustrated and will be described as applicable to the internal combustion engine of Figs. 1, 2, 3, 3a and 4. That is, the disclosure of Fig. 18 omits the construction and arrangement, or means, 162.

Said construction and arrangement, or means, 162 performs its intended service by accomplishing swinging adjustment of the crank member 62, including the crank arm 64 and the curved element 63 rigid with said crank arm, upon the hinge or joint 71, securing said crank member 62 to the fly wheel 67, in direction toward and away from the oscillatable member or disc 31, and the construction and arrangement, or means, 162, includes mechanism for so adjusting the crank member 62, as well as for securing said crank member in fixed relation to the power shaft 65 and its longitudinal axis at any adjusted position to which the crank member may be set.

The accomplishment of swinging adjustment of the crank member 62, including the crank arm 64 and the curved element 63 rigid with said crank arm, toward and away from the oscillatable member or disc 31, through the medium of the construction and arrangement, or means, 126, is not contemplated, and does not function, to substantially alter the position of the thrust bearing member 79 and the yoke 75 lengthwise of the curved guide ways 77 of the curved element 63. Instead, said thrust bearing member 79 with yoke 75 is, in the main, adapted to be moved longitudinally of said curved guide ways 77 toward and away from the common axis for the fulcrum or support 32 and the power shaft 65 by longitudinal adjustment of said fulcrum or support 32 toward and away from the cylinders 22. Adjustment of the curved yoke 75 and the curved element 63 with curved guide ways 77 for the yoke toward and away from said cylinders 22, as a result of swinging adjustment of said crank member 62, is adapted to cause the curved element 63 and the thrust bearing member 79 with yoke 75 to be swung outwardly away from the common axis for said fulcrum or support 32 and said power shaft 65 with adjustment of the crank member 62 toward the cylinders 22 while said thrust bearing member 79 with yoke 75 remains at position along the length of the guide ways 77 which is not materially changed, and to be swung inwardly toward said common axis for the fulcrum or support 32 and the power shaft 65 with adjustment of said crank member 62 away from said cylinders 22 while the thrust bearing member 79 with yoke 75 remains at position along the length of said guide ways 77 which is not materially changed. Stated differently, adjustable movement of the crank member 62 both toward and away from the cylinders 22 is adapted to cause each of the thrust bearing member 79 and the curved element 63 with curved yoke 75 to be moved in a plane substantially parallel with the dotted line 163 denoting the center point of the curve of the guide ways 77 of the curved element 63. That is, adjustment of the crank member 62 toward the cylinders 22 causes the curved element 63, the yoke 75 and the thrust bearing member 79 to be moved bodily substantially as a unit in general direction toward said cylinders substantially along the line 163 with consequent movement of said curved element, said curved yoke and said thrust bearing member outwardly away from the axis of the power shaft 65, and adjustment of said crank member 62 away from said cylinders 22 causes the curved element 63, the curved yoke 75 and the thrust bearing member 79 to be moved bodily substantially as a unit in general direction away from said cylinders substantially along the line 163 with consequent movement of said curved element, said curved yoke and said thrust bearing member inwardly toward the axis of said power shaft 65.

As hereinbefore set forth, for any particular adjusted position of the curved element 63, closer to or farther away from the cylinders 22, there will be increase of magnitude of the combustion spaces in said cylinders 22 with increase of length of strokes of the pistons 27 caused by adjustment of the fulcrum or support 32 away from the cylinders, as well as decrease of magnitude of said combustion spaces with decrease of length of strokes of said pistons caused by adjustment of said fulcrum or support 32 toward said cylinders, and the magnitudes of the combustion spaces and the length of the strokes of the pistons will be altered in direct proportion, or fixed ratio, the one with respect to the other with longitudinal adjustment of the fulcrum or support 32. Obviously, by bodily movement of the curved element 63 out of any one of its adjustably fixed positions, in direction toward or away from the cylinders 22 substantially along the line 163, the relative values of the length of the strokes of the pistons 27 and the set of volumes of the combustion spaces of the cylinders 22 which is coincidental thereto, or a function thereof, will be altered in proportion, or correspondingly, as the position of said curved element 63 is altered. It follows that the ratio of the magnitudes of the volumes of the combustion spaces of the cylinders 22 and the lengths of the strokes of the pistons 27 can be controllably varied by adjustable alteration of the curved element 63 in direction toward and away from the cylinders 22. In the disclosure as made, the magnitude of each length of strokes of the pistons 27 will be increased relatively to the magnitude of the set of volumes of combustion spaces of the cylinders 22 coincidental thereto, or a function thereof, no matter what the adjusted position of the fulcrum or support 32, with adjustment of the curved element 63 toward the cylinders 22, and vice versa. That is, in the present embodiment of the invention, adjustment of the curved element 63 toward the cylinders 22 will cause the combustion spaces of said cylinders to be decreased in magnitude and the lengths of the strokes of the pistons 27 to be proportionately or correspondingly increased, and vice versa, assuming any fixed adjustment for the fulcrum or support 32.

It is to be understood that the value of the arc or curve of the guide ways 77 can be increased or decreased, if desirable in a particular instance, and need not necessarily be as specifically disclosed in the drawings. And it is also to be understood that the crank member 62 can be adjusted toward and away from the cylinders 22 either while the internal combustion engine is stationary or is operating at any of its speeds.

As shown in the drawings, the special rigid connection 72 between the fly wheel 67 and the crank arm 64 of the crank member 62 is included as a part of the construction and arrangement, or means, 162 for accomplishing swinging adjustment of said crank member 62 about the hinge or joint 71, hereinbefore referred to, as an axis. As disclosed in Figs. 3a, 8 and 9, said crank arm 64 is cut away at 164 to be clear of the adjacent end of the power shaft 65 and the means connecting said power shaft to the fly wheel 67.

Figures 8, 9:
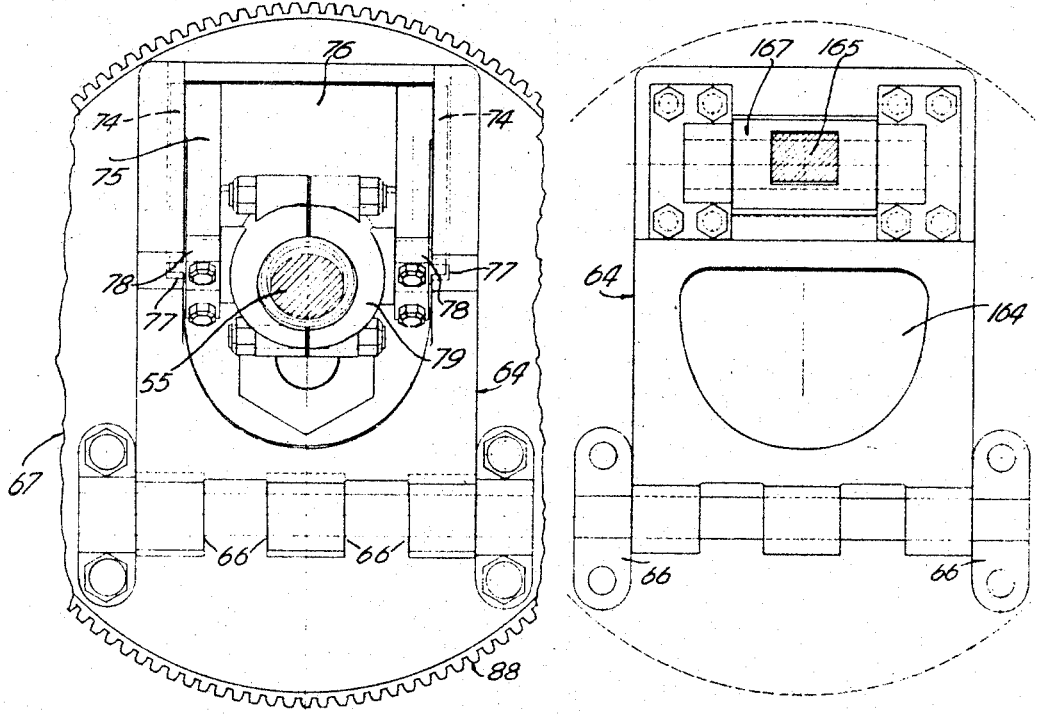

Said special rigid connection 72 is constituted as a link 165, shown in Figs. 3a, 9 and 13, which is situated in an opening 166 of the fly wheel 67. One end portion 167 of said link 165 is arranged in an opening 168 of the crank arm 64 and is pivotally secured to said crank arm as at 169. The other end portion 170 of the link 165 includes an opening 171 thereof which is snugly mounted upon a cam or eccentric 172 adapted to be rotated within said opening 171 in a manner to be made plain. The cam or eccentric 172 is rigid with an actuating shaft 173 therefor, and said actuating shaft 173 is suitably and conveniently mounted, as represented generally at 174, upon the fly wheel 67. As illustrated, the cam or eccentric 172 is at the side of the fly wheel opposite the crank member 62. The link 165 is adapted to be adjusted toward and away from the cylinders 22, to thus cause the crank member 62 to be swung toward and away from said cylinders, about the hinge or joint 71 as an axis, by rotational movement of said cam or eccentric 172.

Mechanism is included for causing the cam or eccentric 172 to be rotated in either direction and to any position of adjustment selected to set the crank member 62 at desired adjusted position, and the general structure is such that said cam or eccentric 172 and said crank member 62 will stably remain, or be fixedly retained, at any position to which adjusted. The mechanism for causing the cam or eccentric 172 to be rotated in either direction is disclosed in Figs. 1, 3a, 13 and 14.

A pair of annular members, denoted 175 and 176, respectively, are suitably and conveniently mounted upon the hub of the fly wheel 67 to be either rotatable with or upon said hub. That is, said annular members 175 and 176 are freely or floatingly mounted upon the hub of said fly wheel. Or, more accurately, the annular member 175 is freely or floatingly mounted upon said hub of the fly wheel 67, and the annular member 176 is freely or floatingly mounted upon said annular member 175. Also, each of the annular members 175 and 176 is arranged to be immovable longitudinally of the hub of the fly wheel.

The annular members 175 and 176 integrally or rigidly support bevel ring gears, represented 177 and 178, respectively, as well as circular elements, indicated 179 and 180, respectively. The bevel ring gears 177 and 178 are disposed in spaced apart, facing relation, and the circular elements 179 and 180 are arranged in closely adjacent relation, as will be clear from Fig. 3a.

A short transverse shaft 181, suitably and conveniently rotatably mounted, as at 182, upon the fly wheel 67 at the side thereof opposite the cylinders 22, fixedly supports a bevel gear 183. Said bevel gear 183 is as illustrated disposed upon an end of the short transverse shaft 181 in meshing relation to both of the bevel ring gears 177 and 178. That is, said bevel ring gears 177 and 178 are, respectively, engaged with the bevel gear 183 at opposite sides of the short rotatable transverse shaft 181. A worm 184 intermediate the ends of the short transverse shaft 181 meshes with a relatively large gear 185 fixed upon a short longitudinal shaft 186 suitably and conveniently rotatably mounted, as at 187, upon said fly wheel 67. The short rotatable longitudinal shaft 186 fixedly supports a gear 188, which is comparatively smaller than the gear 185, and said gear 188 meshes with a worm 189 fixed upon the shaft 173 which supports the cam or eccentric 172.

The internal combustion engine includes separate brakes, indicated 190 and 191, respectively, for selectively causing one or the other of the circular elements 179, 180 to be stationary, while the hub of the fly wheel 67 rotates within the circular element 179 or 180 which is at a particular time made stationary, to thus cause the cam or eccentric 172 to be rotated in one direction or other as may be intended. Except when held stationary by its brake, each circular element 179 and 180 will rotate with said fly wheel and its hub. And, too, both when a brake 190 or 191 is operative to retain its corresponding circular element, 179 or 180, stationary, as well as when neither brake 190, 191 is operative, all of the elements hereinbefore described as mounted upon the fly wheel 67 are adapted to rotate with said fly wheel within the engine body 20. To this end, the interior of said engine body includes an annular clearance space 192 for the fly wheel and its supported elements.

Each brake 190 and 191 is suitably and conveniently mounted, as represented at 193 and 194, respectively, upon the engine body. Any suitable means may be employed for causing each brake separately to be pressingly engaged with its corresponding circular element, to thus cause an engaged circular element to be stationary upon the hub of the fly wheel, or to be released from its corresponding circular element. As illustrated, each of the brakes is adapted to be forced into engagement with its corresponding circular element by actuation inwardly of the engine body 20 of a plunger 195 operatively connected with the corresponding brake by a series, denoted 196 in each instance, of links and levers suitably and conveniently mounted upon the engine body, and each brake is adapted to be released from its corresponding circular element by a coil spring 197 assembled with the corresponding plunger 195 to cause this to be withdrawn when released. Desirably, the plungers 195 are situated to be accessible at the outer side of the engine body. Evidently, brake operating structures other than as disclosed could be employed.

It will be apparent that when either the circular element 179 or the circular element 180 is made stationary by its brake 190 or 191, to thus cause its bevel ring gear 177 or 178 to be at rest, rotation will be imparted to the bevel gear 183, as this moves ahead with the fly wheel 67 during its revolution, to thus cause the cam or eccentric to be rotated. It also will be apparent that the direction in which the cam or eccentric 172 is caused to rotate by retaining one of the bevel gear rings stationary will be opposite the direction in which said cam or eccentric is caused to rotate by retaining the other of said bevel ring gears stationary. For any adjustment of the crank member 62, the braking action to accomplish the adjustment will of course be discontinued when said crank member has reached the intended position.

Figure 17:
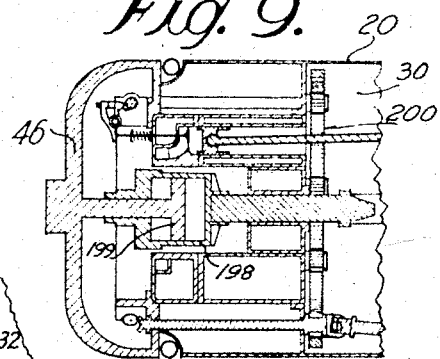
Fig. 17 is a fragmentary central, longitudinal sectional view of an internal combustion engine of modified construction including features and characteristics of the invention.

In Fig. 17 there is disclosed an internal combustion engine including a hydraulic container 198 with piston 199, equivalent to the hydraulic container 45 with piston 49 of Fig. 3 and for the same purpose, situated within the cylinder head. The internal combustion engine of said Fig. 17 also includes a ring gear 200, equivalent to the ring gear 96 of Figs. 2 and 3 and for the same purpose, situated within the chamber or case 30. In all respects except as noted the internal combustion engine of Fig. 17 can be constructed substantially as hereinbefore described in connection with the disclosure of Figs. 1 to 16.

Figure 10:
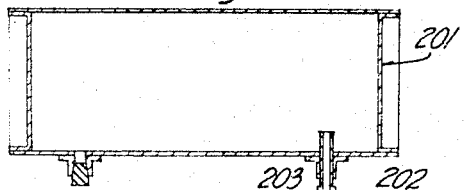
Fig. 10 is a detail sectional view, on a reduced scale, of a type of reservoir, including pipe connections, which can be employed as a fluid or oil pressure tank of the internal combustion engine.

Pressure can be applied within the hydraulic container 45 at either side of the piston 49, to thus cause said hydraulic container to be actuated and the fulcrum or support 32 as a consequence to be longitudinally adjustably moved, from a pressure tank or reservoir 201, shown on a reduced scale in Fig. 10, adapted to contain oil or other fluid under pressure. The oil or fluid is adapted to be supplied to the pressure tank or reservoir, from a pump and in a manner presently to be described, through an inlet pipe connection 202 leading from the pump to said pressure tank or reservoir, and oil or fluid under pressure is adapted to be supplied from the pressure tank or reservoir to the container 45 through an outlet pipe connection 203 from said pressure tank or reservoir. Each pipe fitting 54 leads from a pair of valves, indicated 204 and 205, respectively. Each valve 204 controls a pipe connection 206 which leads from the outlet pipe connection 203, and each valve 205 controls a pipe connection 207 which leads to a source of oil or fluid supply for the pump. Obviously, by suitable manipulation of the valves 204 and 205, oil or fluid under pressure can be supplied to the interior of the container 45 selectively at either side of the piston 49 to extent or degree adapted to accomplish any predetermined adjustment of said container relatively to said piston, as well as retained in the container to cause it to be rigidly fixed to the piston at any position to which set.

Figures 11, 12:
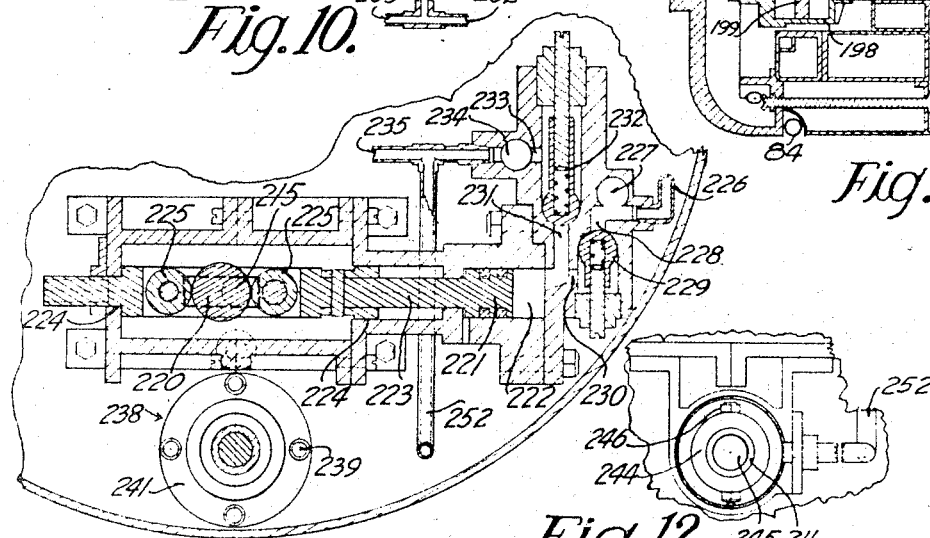

The pump of the internal combustion engine for supplying oil or fluid under pressure to the pressure tank or reservoir 201 is disclosed in Figs. 3a, 11 and 12 of the drawings. As there shown, said pump is suitably and conveniently situated in a portion 208 of the engine body 20, and said portion 208 is constructed to provide a compartment for housing oil or other fluid adapted to constitute a source of oil or fluid supply for the pump, as well as to be useful for lubricating the internal combustion engine.

The pressure tank or reservoir 201 is adapted to contain oil or fluid under a predetermined, substantially constant pressure, and provision is made for causing the pump to be operative to maintain the pressure of oil or fluid in said pressure tank or reservoir 201 at substantially fixed value. More explicitly, mechanism is included for causing the pump to be operative to supply oil or fluid under pressure to the pressure tank or reservoir 201 whenever the pressure of oil or fluid in said tank or reservoir is, or falls, below a desired and predetermined value, and for causing the pump to be inoperative to supply oil or fluid to the pressure tank or reservoir when this contains pressure oil or fluid at said desired and predetermined value.

A drive shaft 209 for the pump is secured, as at 210, to an end of one of the shafts of the driving connection 90, and as illustrated said drive shaft extends longitudinally of the engine body. The drive shaft 209 is mounted in a tubular clutch member 211 adapted to have longitudinal sliding movement upon said drive shaft, and said tubular clutch member 211 is suitably and conveniently rotatably mounted, as at 212, upon said engine body. The drive shaft 209 for the pump is adapted to be rotated with the driving connection 90 as this is rotated, and, like said driving connection, said drive shaft 209 is fixed against longitudinal movement in the engine body.

The tubular clutch member 211 is adapted to be driven by the drive shaft 209 when this is intentional, and said tubular clutch member is adapted when itself driven by said drive shaft 209 to cause a gear 213 to be driven. The gear 213 is freely or floatingly mounted upon the drive shaft 209 at location adjacent an end of the tubular clutch member 211, and said gear 213 is suitably fixed, as indicated at 214, against the possibility of longitudinal movement along said drive shaft 209.

A cam shaft 215 for causing the pistons of the pump to be actuated extends longitudinally of the engine body and is mounted thereon as at 216. The cam shaft 215 is adapted to be rotated through the medium of a gear 217 fixed on said cam shaft, and an idler gear 218 in mesh with said gear 217 and also in mesh with the gear 213. The idler gear 218 can be supported upon the engine body in any suitable and convenient manner, as denoted at 219.

Cams 220, three as shown, upon the cam shaft 215 are for actuating pump pistons 221 situated in pump cylinders 222 suitably and conveniently supported in the engine body. As disclosed, there are three pump cylinders 222 each with piston 221, including of course a pump cylinder with piston corresponding to each cam 220. Each pump piston 221 is carried by a piston rod 223 slidably guided, as at 224, in the engine body and supporting usual, spaced apart pressure rollers 225 at the opposite sides of the corresponding cam 220 for translating turning movement of the cams into reciprocating movement of the pump pistons.

An intake pipe connection from the source of oil or fluid supply to the pump is indicated 226 in Fig. 11. The intake pipe connection 226 leads to an intake chamber 227. Passages 228 lead from the intake chamber 227 to an intake control valve 229 for each pump cylinder 222, and passages 230, including a passage 230 for each intake control valve 229, lead from the intake control valves to the pump cylinders. Passages 231, including a passage 231 for each pump cylinder 222, lead from the pump cylinders to a delivery control valve 232 for each cylinder. Passages 233 lead from the delivery control valves, including a passage 233 for each delivery control valve 232, to a delivery chamber 234, and a pipe connection 235 leads from the delivery chamber 234 to the inlet pipe connection 202 upon the pressure tank or reservoir 201.

At times when the pressure of oil or fluid in the pressure tank or reservoir 201 is below the desired and predetermined pressure, the drive shaft 209 is adapted to be operatively engaged with the tubular clutch member 211 to cause said tubular clutch member to be driven in response to rotation of said drive shaft, and the tubular clutch member is, in turn, adapted to be operatively engaged with the gear 213 to cause said gear to be driven in response to rotation of said tubular clutch member. And, too, at times when the pressure in the tank or reservoir 201 is as desired and predetermined, the drive shaft 209 is adapted to be released from driving relation to the tubular clutch member and said tubular clutch member is adapted to be released from driving relation to the gear 213.

The tubular clutch member 211 and the gear 213 include complemical clutch faces, indicated 236 and 237, respectively, which normally are adapted to engage each other by reason of resilient pressure exerted by devices, or a device, 238 supported in part by said tubular clutch member 211 and in part by said gear 213. More explicitly, the device, or devices, 238 includes a plurality of longitudinally extending rods, each represented 239, rigid with the gear 213 and slidable in an annular element 240 fixed to the tubular clutch member 211, a ring 241 fixed to each rod 239 in spaced relation to the annular element 240 at the side thereof opposite the gear 213, and a coil spring 242 upon each rod 239 between the ring 241 and the annular element 240 urging said annular element and the tubular clutch member toward the gear 213.

An annular disc 243 is situated upon and about the end portion of the tubular clutch member 211 which is opposite the clutch face 236, and said annular disc 243 includes an annular flange 244 at the side thereof opposite said clutch face 236. A clutching element 245 is situated within the end portion of the tubular clutch member 211 adjacent the annular disc 243, and said annular disc 243 and clutching element 245 are made rigid with the tubular clutch member 211 through the medium of a pin 246 which passes through all of said annular flange 244, tubular clutch member 211 and clutching element 245. A clutching extension 247 upon the clutching element 245 is situated in a longitudinal slot 248 in the adjacent end of the pump drive shaft 209, and said clutching extension is adapted to be grasped to the drive shaft 209 when moved inwardly of the slot 248 and to be released from said drive shaft when moved outwardly of said slot.

An annular diaphragm 249 is suitably and conveniently mounted, as at 250, in the engine body in surrounding relation to the tubular clutch member 211, and as disclosed the annular diaphragm 249 is fixed against turning movement in said engine body. An end portion of said annular diaphragm 249 opposite the annular disc 243 is held stationary in the engine body by the mounting 212 for the tubular clutch element 211. A portion of the annular diaphragm 249 adjacent the annular disc 243 is rigid with an annular element 251 surrounding the tubular clutch element 211 and providing a bearing upon which said annular disc 243 is adapted to rotate. Said tubular clutch element 211 is situated within the annular element 251 to turn freely therein. A pipe connection 252 leads from the pipe connection 235 to the interior of the annular diaphragm 249.

It will be noted that the interior of the pressure tank or reservoir is in open communication with the interior of the annular diaphragm 249 through the instrumentality of the pipe connections 235 and 252, so that whatever pressure of oil or fluid prevails in said pressure tank or reservoir 201 will also prevail in said annular diaphragm 249. The construction and arrangement will be such that when the pressure of oil or fluid in the pressure tank or reservoir and the annular diaphragm is below a desired and predetermined pressure, the device, or devices, 238 will urge the tubular clutch member 211 to position causing the clutching extension 247 to be situated sufficiently inwardly of the longitudinal slot 248 to drivingly connect the drive shaft 209 to said tubular clutch member, as well as causing the clutch face 236 upon the tubular clutch member to be drivingly engaged with the clutch face 237 upon the gear 213. Thus, as will be obvious, the pump of the internal combustion engine will be kept in constant operation, whenever the internal combustion engine is operating, to supply oil or fluid under pressure to the pressure tank or reservoir 201 at all times when the pressure of oil or fluid in said pressure tank or reservoir is below the intended pressure. The construction and arrangement will also be such that when the pressure of oil or fluid in the pressure tank or reservoir and the annular diaphragm is as desired and predetermined, said annular diaphragm will be sufficiently expanded to actuate the tubular clutch member 211, against the resilient action of the device, or devices, 238, to position causing the clutching extension 247 to be situated sufficiently outwardly of the longitudinal slot 248 to release the drive shaft 209 from driving connection with said tubular clutch member, as well as causing the clutch faces 236 and 237 to be disengaged. Thus, said pump will be inoperative at all times when the pressure in the pressure tank or reservoir is as desired and predetermined.

What is claimed is:

1. In an internal combustion engine, a plurality of cylinders, a piston in each cylinder, a connecting rod secured to each piston, an oscillatable member, means oscillatably connecting each of said connecting rods to said oscillatable member, an actuator upon said oscillatable member, a shaft adapted to be rotated, a crank arm for rotating said shaft, means pivotally securing said crank arm to said shaft, and means universally securing said actuator and said crank arm to each other.

2. In an internal combustion engine, a plurality of cylinders, a piston in each cylinder, a connecting rod secured to each piston, an oscillatable member, means oscillatably securing each of said connecting rods to said oscillatable member, a fulcrum, means universally securing said oscillatable member to said fulcrum, an actuator upon said oscillatable member, a device adapted to be driven, a crank arm, means pivotally securing said crank arm to said device, and means universally securing said actuator and said crank arm to each other.

3. In an internal combustion engine, a plurality of cylinders, a piston in each cylinder, a connecting rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank arm pivoted to said device in driving relation thereto, and means universally securing said actuator and said crank arm to each other.

4. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at location in spaced relation to the fulcrum, an actuator upon said oscillatable member and opposite the universal connection between the fulcrum and oscillatable member, a device adapted to be rotated, a crank arm pivoted to said device in driving relation thereto, means universally securing said actuator and said crank arm to each other, and means for accomplishing angular adjustment of said crank arm relatively to said device to thus adjustably alter the length of the strokes of said pistons and controllably maintain an effective and economical ratio.

5. In an internal combustion engine, a plurality of cylinders, a reciprocable piston in each cylinder, a connecting rod secured to each piston, an cscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be rotated, a crank arm pivoted to said device in driving relation thereto, means universally securing said actuator and said crank arm to each other, and means for adjusting said fulcrum with said oscillatable member and its actuator in direction toward and away from said cylinders, adjustment of said oscillatable member toward said cylinders being adapted to angularly adjust said crank arm in direction away from right angle relation to said device to correspondingly shorten the length of the strokes of said pistons and to cause the pistons to have positions in the cylinders providing correspondingly smaller combustion volumes, and adjustment of said oscillatable member away from said cylinders being adapted to angularly adjust said crank arm in direction toward right angle relation to said device to correspondingly lengthen the length of the strokes of said pistons and to cause the pistons to have positions in the cylinders providing correspondingly larger combustion volumes.

6. In an internal combustion engine, a plurality of cylinders, a piston in each cylinder, a device to be driven, mechanism operatively connecting said pistons to said device, and means for adjustably shortening and lengthening the length of the strokes of said pistons in such manner that with shortening of the piston strokes said pistons will move to positions in the cylinders providing smaller combustion volumes in harmony with a smaller intake of fuel and a relatively shorter travel of piston movement to absorb a proportionately less intensive power impulse and with lengthening of the piston strokes said pistons will move to positions in the cylinders providing larger combustion volumes in harmony with a greater intake of fuel and a relatively longer travel of piston movement to absorb a more intensive power impulse and thus maintain an effective and controlled compression ratio at various lengths of piston strokes and various combustion volumes.

7. In an internal combustion engine, a plurality of cylinders, a piston in each cylinder, a connecting rod secured to each piston, a device to be driven, mechanism operatively attaching said connecting rods to said device, and means for adjustably shortening and lengthening the length of the strokes of said pistons, said means being adapted to cause the pistons to move to positions in the cylinders providing correspondingly smaller combustion volumes to maintain economical and effective compression ratios with smaller intake of combustible fuels with shortening of the piston strokes and to move to position in the cylinders providing correspondingly larger combustion volumes to maintain economical and effective compression ratios with greater intake of combustible fuels with lengthening of the piston strokes.

8. In an internal combustion engine, a plurality of cylinders, a piston in each cylinder, a device to be driven, mechanism operatively connecting said pistons to said device, and means for adjustably altering the length of the strokes of said pistons and simultaneously altering the volumes of the combustion chambers of said cylinders in such manner that said volumes are made smaller in direct proportion as the piston strokes are shortened and the volume of intake of combustible fuel reduced and are made larger in direct proportion as the piston strokes are lengthened and the volume of intake of combustible fuel increased to thus maintain at all lengths of piston stroke and correspondingly greater or smaller volumes of combustion chambers uniformly effective and economical ratios in said combustion chambers.

9. In combination, a plurality of cylinders, a reciprocable piston in each cylinder, a connecting rod secured to each piston, an oscillatable member, a fulcrum, means universally securing an intermediate portion of said oscillatable member to said fulcrum, means securing each of said connecting rods to said oscillatable member at locations in spaced relation to said fulcrum, an actuator upon said oscillatable member and opposite the universal connection between the fulcrum and oscillatable member, a device adapted to have movement, a crank arm pivoted to said device in operative relation thereto, means universally securing said actuator and said crank arm to each other, and means for adjusting said fulcrum with said oscillatable member and its actuator in direction toward and away from said cylinders longitudinally thereof, adjustment of said oscillatable member toward said cylinders being adapted to shorten the length of the strokes of the pistons and to cause the pistons to have positions in the cylinders farther away from said device, and adjustment of said oscillatable member away from said cylinders being adapted to lengthen the strokes of said pistons and to cause the pistons to have positions in the cylinders closer to said device.

10. In combination, a plurality of cylinders, a reciprocable piston in each cylinder, a connecting rod secured to each piston, an oscillatable member, a fulcrum, means universally securing an intermediate portion of said oscillatable member to said fulcrum, means securing each of said connecting rods to said oscillatable member at locations in spaced relation to said fulcrum, an actuator upon said oscillatable member and opposite the universal connection between the fulcrum and oscillatable member, a device adapted to have movement, a crank arm pivoted to said device in operative relation thereto, means universally securing said actuator and said crank arm to each other, and means for adjusting said fulcrum with said oscillatable member and its actuator in direction toward and away from said cylinders longitudinally thereof, adjustment of said oscillatable member toward said cylinders being adapted to angularly adjust said crank arm in direction away from right angle relation to said device to correspondingly shorten the length of the strokes of said pistons and to cause the pistons to have positions in the cylinders farther away from said device, and adjustment of said oscillatable member away from said cylinders being adapted to angularly adjust said crank arm in direction toward right angle relation to said device to correspondingly lengthen the strokes of said pistons and to cause the pistons to have positions in the cylinders closer to said device.

11. In combination, a plurality of cylinders, a reciprocable piston in each cylinder, a connecting rod secured to each piston, an oscillatable member, a fulcrum, means universally securing an intermediate portion of said oscillatable member to said fulcrum, means securing each of said connecting rods to said oscillatable member at locations in spaced relation to said fulcrum, an actuator upon said oscillatable member opposite the universal connection between the fulcrum and oscillatable member, a device adapted to have movement, means adapted to be driven by said actuator and to drive said device, and means for adjusting said fulcrum with said oscillatable member and its actuator in direction toward and away from said cylinders longitudinally thereof, adjustment of said oscillatable member toward said cylinders being adapted to shorten the length of the strokes of the pistons and adjustment of said oscillatable member away from said cylinders being adapted to lengthen the strokes of said pistons.

12. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum, means securing each of said connecting rods to said oscillatable member at locations in spaced relation to said fulcrum, an actuator upon said oscillatable member opposite the universal connection between the fulcrum and oscillatable member, a device adapted to have movement, means adapted to be driven by said actuator and to drive said device, and means for adjusting said fulcrum with said oscillatable member and its actuator in direction toward and away from said cylinders longitudinally thereof, adjustment of said oscillatable member toward said cylinders being adapted to shorten the strokes of the pistons and provide power impulses of decreased intensity and adjustment of said oscillatable member away from said cylinders being adapted to lengthen the strokes of said pistons and provide power impulses of increased intensity.

13. In an internal combustion engine, a plurality of cylinders, a reciprocable piston in each cylinder, a device adapted to be driven, mechanism including an actuator operatively connecting said pistons to said device, and means for adjusting said mechanism and said actuator relatively to said device to cause the length of the strokes and the intensity of the power impulses of said pistons to be adjustably altered in direct proportion to each other.

14. In an internal combustion engine, a plurality of cylinders, a reciprocable piston in each cylinder, a connecting rod oscillatably secured to each piston, a device adapted to be driven, mechanism including an actuator operatively securing said connecting rods to said device, and means for manipulating said mechanism and actuator relatively to said device to adjustably shorten and lengthen the length of the strokes of said pistons, shortening of the piston strokes being adapted to cause the pistons to move to positions in the cylinders providing smaller combustion volumes, and lengthening of the piston strokes being adapted to cause the pistons to move to positions in said cylinders providing larger combustion volumes.

15. In an internal combustion engine, a plurality of cylinders arranged in a circumference common to all of said cylinders, a reciprocable piston in each cylinder, a connecting rod secured to each piston, a device adapted to be driven, mechanism including an actuator operatively securing said connecting rods to said device, and means for manipulating said mechanism and actuator in direction away from said device to adjustably shorten the length of the strokes of said pistons and in direction toward said device to adjustably lengthen the length of the strokes of said pistons, shortening of the piston strokes being adapted to cause the pistons to move to positions in the cylinders providing smaller combustion volumes in harmony with smaller intake of fuel and shorter travel of piston movement, and lengthening of the piston strokes being adapted to cause the pistons to move to positions in said cylinders providing larger combustion volumes in harmony with greater intake of fuel and longer travel of piston movement.

16. In an internal combustion engine, a plurality of cylinders, a piston in each cylinder, a connecting rod secured to each piston, an oscillatable member, means oscillatably securing each of said connecting rods to said oscillatable member, an actuator upon said oscillatable member, a device adapted to be driven, a crank member for driving said device, and means universally securing said actuator and crank member to each other.

17. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank member for driving said device, means universally securing said actuator and said crank member to each other, and means for accomplishing adjustment of said actuator relatively to said device to thus adjustably alter the length of the strokes of said pistons.

18. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank member for driving said device, means universally securing said actuator and said crank member to each other, and means for accomplishing adjustment of said actuator relatively to said crank member and said device to thus adjustably alter the length of the strokes of said pistons.

19. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank member for driving said device, means universally securing said actuator and said crank member to each other, and means for manipulating said actuator relatively to said device to adjustably shorten and lengthen the length of the strokes of said pistons, shortening of the piston strokes being adapted to cause the pistons to move to positions in the cylinders providing smaller combustion volumes in harmony with smaller intake of fuel and shorter travel of piston movement, and lengthening of the piston strokes being adapted to cause the pistons to move to positions in said cylinders providing larger combustion volumes in harmony with greater intake of fuel and longer travel of piston movement.

20. In an internal combustion engine, the combination with means for controllably varying the length of the strokes of pistons and the volumes of combustion spaces of cylinders of said engine to create and maintain a direct proportion relationship between the power output of said engine and the fuel consumed thereby, of means for controllably varying the ratio of the magnitudes of the lengths of the strokes of said pistons and the volumes of said combustion spaces of said cylinders.

21. In an internal combustion engine, the combination with means for adjustably altering the length of the strokes of pistons and the volumes of combustion spaces of cylinders of said engine in direct proportion to each other, with resultant production in the engine of different sets of volumes for said combustion spaces including a set of said volumes coincidental to each different length of strokes for said pistons, of means for adjustably altering the relative values of each different length of strokes of said pistons and the set of volumes of said combustion spaces coincidental thereto.

22. In an internal combustion engine, the combination with means for adjustably altering the length of the strokes of pistons and the volumes of combustion spaces of cylinders of said engine in direct proportion to each other, with resultant production in the engine of different lengths of strokes for said pistons and a different set of volumes for said combustion spaces coincidental to each different length of strokes for said pistons, of means for controllably varying the ratio of the magnitudes of said different lengths of the strokes for said pistons and the magnitudes of said different sets of volumes of said combustion spaces by adjustable alteration of the relative values of each different length of the strokes of said pistons and the set of volumes of said combustion spaces coincidental thereto.

23. In an internal combustion engine, a plurality of cylinders, a reciprocable piston in each cylinder, a device adapted to be driven, mechanism including an actuator operatively connecting said pistons to said device, means for adjusting said mechanism and said actuator relatively to said device to cause the length of the strokes and the intensity of the power impulses of said pistons to be adjustably altered in direct proportion to each other, and means for controllably varying the ratio of the magnitudes of said length of the strokes and said intensity of the power impulses of said pistons.

24. In an internal combustion engine, a plurality of cylinders, a reciprocable piston in each cylinder, a connecting rod oscillatably secured to each piston, a device adapted to be driven, mechanism including an actuator operatively securing said connecting rods to said device, means for manipulating said mechanism and actuator relatively to said device to adjustably alter the length of the strokes of said pistons and the volumes of combustion spaces of said cylinders in direct proportion to each other, with resultant production in the engine of different sets of volumes for said combustion spaces including a set of said volumes coincidental to each different length of the strokes for said pistons, and means for manipulating said actuator relatively to said device to controllably vary the ratios of the magnitudes of each different length of strokes of said pistons and the set of volumes of said combustion spaces coincidental thereto.

25. In an internal combustion engine, a plurality of cylinders arranged in a circumference common to all of said cylinders, a reciprocable piston in each cylinder, a connecting rod secured to each piston, a device adapted to be driven, mechanism including an actuator operatively securing said connecting rods to said device, means for manipulating said mechanism and actuator relatively to said device to adjustably alter the length of the strokes of said pistons and the volumes of combustion spaces of said cylinders in direct proportion to each other, with resultant production in the engine of different sets of volumes for said combustion spaces including a set of said volumes coincidental to each different length of the strokes of said pistons, manipulation of said mechanism and actuator in direction away from said device being adapted to adjustably shorten the length of the strokes of said pistons and in direction toward said device being adapted to lengthen the length of the strokes of said pistons, and means for manipulating said actuator relatively to said device to adjustably alter the relative values of the magnitudes of each different length of strokes of said pistons and the set of volumes of said combustion spaces coincidental thereto.

26. In an internal combustion engine, a plurality of cylinders, a reciprocable piston in each cylinder, a connecting rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank member for driving said device, means for universally securing said actuator and said crank member to each other, means for manipulating said actuator relatively to said device to adjustably alter the length of the strokes of said pistons and the volumes of combustion spaces of said cylinders in direct proportion to each other, with resultant production in the engine of different lengths of strokes for said pistons and a different set of volumes for said combustion spaces coincidental to each different length of strokes for said pistons, shortening of said piston strokes being adapted to cause the pistons to be moved to positions in the cylinders providing smaller combustion volumes in harmony with smaller intake of fuel and shorter travel of piston movement, and lengthening of the piston strokes being adapted to cause the pistons to move to positions in said cylinders providing larger combustion volumes in harmony with greater intake of fuel and longer travel of piston movement, and means for manipulating said actuator relatively to said device to controllably vary the ratio of the magnitudes of said different lengths of strokes of said pistons and the magnitudes of said different sets of volumes of said combustion spaces by adjustable alteration of the relative values of each different length of the strokes of said pistons and the set of volumes of said combustion spaces coincidental thereto.

27. In an internal combustion engine, a plurality of cylinders each including a combustion space, a plurality of pistons including a piston in each cylinder, a connectng rod secured to each piston, an oscillatable member, a fulcrum, means universally securing an intermediate portion of said oscillatable member to said fulcrum, means in surrounding relation to said fulcrum oscillatably securing each of said connecting rods to said oscillatable member at locations in spaced relation to the fulcrum, an actuator upon said oscillatable member and opposite the universal connection between the fulcrum and oscillatable member, a device adapted to be driven, a crank member for driving said device, means for universally securing said actuator and said crank member to each other, said pistons being adapted to be reciprocated to cause said device to be driven and to produce a set of volumes for the combustion spaces of said cylinders coincidental to the length of the strokes for said pistons, and means for controllably varying the magnitude of said set of volumes of said combustion spaces relatively to the magnitude of said length of the strokes of said pistons.

HERMAN E. OLSON.